US010789614B2

(12) United States Patent
Zhou

(10) Patent No.: US 10,789,614 B2
(45) Date of Patent: Sep. 29, 2020

(54) METHOD AND SYSTEM FOR ISSUING RECOMMENDED INFORMATION

(71) Applicant: Tencent Technology (Shenzhen) Company Limited, Shenzhen (CN)

(72) Inventor: Bin Zhou, Shenzhen (CN)

(73) Assignee: TENCENT TECHNOLOGY (SHENZHEN) COMPANY LIMITED, Shenzhen, Guangdong Province (CN)

( * ) Notice: Subject to any disclaimer, the term of this patent is extended or adjusted under 35 U.S.C. 154(b) by 985 days.

(21) Appl. No.: 15/146,694

(22) Filed: May 4, 2016

(65) Prior Publication Data
US 2016/0247188 A1 Aug. 25, 2016

Related U.S. Application Data

(63) Continuation of application No. PCT/CN2014/090867, filed on Nov. 12, 2014.

(30) Foreign Application Priority Data

Nov. 13, 2013 (CN) .......................... 2013 1 0571458

(51) Int. Cl.
*G06Q 30/00* (2012.01)
*G06Q 30/02* (2012.01)
(Continued)

(52) U.S. Cl.
CPC ..... *G06Q 30/0251* (2013.01); *G06F 16/9535* (2019.01); *G06Q 30/02* (2013.01); *G06Q 50/01* (2013.01)

(58) Field of Classification Search
CPC . G06Q 30/0277; G06Q 30/0269; G06Q 30/02
See application file for complete search history.

(56) References Cited

U.S. PATENT DOCUMENTS 10,261,938 B1* 4/2019 Jenkins ................. G06F 15/167
2002/0165969 A1* 11/2002 Gallant .................. H04L 67/14
709/227

(Continued)

FOREIGN PATENT DOCUMENTS

CN 103246657 A 8/2013
CN 103390000 A 11/2013
CN 103886074 A 6/2014

OTHER PUBLICATIONS

Faravelon; Privacy conscious web apps composition; IEEE 2006; pp. 291-305; 2006.*

(Continued)

*Primary Examiner* — Radu Andrei
(74) *Attorney, Agent, or Firm* — Morgan, Lewis & Bockius LLP

(57) ABSTRACT

A server with processor(s) and memory receives an initial request for a logo picture hosted by the server from a client. In response to receiving the initial request, the server: generates an identifier for the client; provides the logo picture and the identifier to the client; obtains identification information for a social network corresponding to a user based on a current active login state of the user on the social network through the client, which is linked to characteristics of the user; and stores the identification information in association with the identifier. The server receives a subsequent request for the logo picture from the client that includes the identifier. In response to receiving the subsequent request, the server: identifies the characteristics of the user according to the stored association between the identifier and the identification information; and provides advertisement(s) to the client based on the characteristics of the user.

20 Claims, 18 Drawing Sheets

(51) Int. Cl.
*G06F 16/9535* (2019.01)
*G06Q 50/00* (2012.01)

(56) References Cited

U.S. PATENT DOCUMENTS

| | | | | |
|---|---|---|---|---|
| 2003/0004874 A1* | 1/2003 | Ludwig | G06Q 20/102 | 705/40 |
| 2004/0192383 A1* | 9/2004 | Zacks | H04W 92/18 | 455/557 |
| 2005/0003868 A1* | 1/2005 | Oh | H04M 1/72586 | 455/566 |
| 2007/0259654 A1* | 11/2007 | Oijer | H04L 51/02 | 455/415 |
| 2008/0133500 A1* | 6/2008 | Edwards | G06F 16/24578 | |
| 2009/0235081 A1* | 9/2009 | Hamid | G06Q 20/3226 | 713/176 |
| 2009/0248524 A1* | 10/2009 | Defoy | G06Q 30/02 | 705/14.1 |
| 2010/0076863 A1* | 3/2010 | Golomb | G06F 16/958 | 705/26.1 |
| 2010/0076946 A1* | 3/2010 | Barker | G06F 16/958 | 707/705 |
| 2010/0192068 A1* | 7/2010 | Wineinger | G06F 21/645 | 715/744 |
| 2014/0122255 A1* | 5/2014 | Snyder | G06Q 30/0276 | 705/14.72 |
| 2014/0143646 A1* | 5/2014 | Branton | G06F 16/972 | 715/234 |
| 2014/0164098 A1* | 6/2014 | Chanda | G06Q 30/0277 | 705/14.43 |
| 2014/0379507 A1* | 12/2014 | Pitt | G06Q 30/0601 | 705/26.1 |
| 2015/0026062 A1* | 1/2015 | Paulsen | G06Q 30/0279 | 705/44 |
| 2015/0058016 A1* | 2/2015 | Goldstein | G06F 21/32 | 704/246 |
| 2015/0381424 A1* | 12/2015 | Maetz | A63F 13/49 | 709/223 |

OTHER PUBLICATIONS

Xu; Secure Web Referral Services for Mobile Cloud Computing; IEEE 2013; pp. 584-592; 2013.*
Tencent Technology, ISRWO, PCT/CN2014/090867, dated Feb. 17, 2015, 8 pgs.
Tencent Technology, IPRP, PCT/CN2014/090867, dated May 17, 2016, 7 pgs.

* cited by examiner

METHOD AND SYSTEM FOR ISSUING RECOMMENDED INFORMATION

PRIORITY CLAIM AND RELATED APPLICATION

This application is a continuation application of PCT Patent Application No. PCT/CN2014/090867, entitled "METHOD AND SYSTEM FOR ISSUING RECOMMENDED INFORMATION" filed on Nov. 12, 2014, which claims priority to Chinese Patent Application No. 201310571458.8, entitled "Method, System, Server and Browser for Issuing Recommended Information," filed on Nov. 13, 2013, both of which are incorporated by reference in their entirety.

TECHNICAL FIELD

The present disclosure relates to the field of computer data processing technologies, and in particular, to a method and system for issuing recommended information.

BACKGROUND

A conventional scheme for issuing recommended information (e.g., advertisements) is as follows: A requestor requests to visit a web page via a browser. After receiving a visiting request, a server hosting the web page or resources therein identifies the requestor, extracts recommended information matching the requestor, and sends the recommended information to the requestor for display.

At present, a cookie-based tracking manner is typically used for identifying the requestor. The cookie (or cookies), refers to data (usually encrypted) stored on a local terminal of the requestor by the browser for a website in order to distinguish a user identity and perform session tracking.

After the user exits the visited web page, previously stored data is reserved in the cookie. In this way, when the requestor subsequently attempts to visit the web page via the browser, a website is able to acquire the data in the cookie that was previously stored by the browser at the local terminal. Therefore, the server may extract the recommended information matching the requestor according to the stored user information, and sends the recommended information to the requestor for display. In this manner, targeted recommended information can be provided. For example, the user views the information about sports previously. Later, when the user browses other websites, recommended information about sports may be shown.

If sensitive information, such as user name and password, is encrypted in the cookie, reverse cracking will be difficult. Even so, a hacker may steal the browser cookie of the user through a Trojan virus, and swindle the confidence of the website directly through the stolen cookie data. As such, there are still risks with adopting the cookie-based tracking manner. In conclusion, the existing cookie-based tracking manner for issuing recommended information has security risks, has low accuracy, and cannot accurately issue the recommended information.

SUMMARY

The embodiments of the present disclosure provide methods and systems for providing targeted advertisements. In some embodiments, a logo picture (or another web resource) hosted by a server system (i.e., a logo server) is included on a plurality of independent websites that are all connected to (or owned by) a social networking platform. In some embodiments, knowledge of users logged into the social networking platform can be leveraged to serve targeted advertisements on web pages of the websites with the logo picture.

In some embodiments, a method of providing targeted advertisements is performed at a logo server (e.g., server system 108, FIGS. 1-2) with one or more processors and memory that hosts one or more resources for a plurality of websites including a logo picture included on the plurality of websites. The method includes receiving a first initial request for a logo picture hosted by the logo server (e.g., a web resource with a URL) from a first client device. In response to receiving the first initial request for the logo picture from the first client device, the method includes: generating a first electronic identifier for the first client device; providing the logo picture corresponding to the first initial request and the first electronic identifier to the first client device; obtaining first user identification information for a social networking platform that corresponds to a first user of the first client device based on a current active login state of the first user on the social networking platform through the first client device; and storing the first user identification information in association with the first electronic identifier for the first client device, where the first user identification information is linked to a first set of characteristics of the first user. The method includes receiving a first subsequent request for the logo picture from the first client device, where the first subsequent request includes the first electronic identifier. In response to receiving the first subsequent request including the first electronic identifier, the method includes: identifying the first set of characteristics of the first user according to the stored association between the first electronic identifier and the first user identification information for the social networking platform that corresponds to the first user of the first client device; and providing one or more advertisements to the first client device based at least in part on the first set of characteristics of the first user.

In some embodiments, a computer system (e.g., server system 108 (FIGS. 1-2)) includes one or more processors and memory storing one or more programs for execution by the one or more processors, the one or more programs include instructions for performing, or controlling performance of, the operations of any of the methods described herein. In some embodiments, a non-transitory computer readable storage medium storing one or more programs, the one or more programs comprising instructions, which, when executed by a computer system (e.g., server system 108 (FIGS. 1-2)) with one or more processors, cause the computer system to perform, or control performance of, the operations of any of the methods described herein. In some embodiments, a computer system (e.g., server system 108 (FIGS. 1-2)) includes means for performing, or controlling performance of, the operations of any of the methods described herein.

Various advantages of the present application are apparent in light of the descriptions below.

BRIEF DESCRIPTION OF DRAWINGS

The aforementioned features and advantages of the disclosed technology as well as additional features and advantages thereof will be more clearly understood hereinafter as a result of a detailed description of preferred embodiments when taken in conjunction with the drawings.

To describe the technical solutions in the embodiments of the present disclosed technology or in the prior art more clearly, the following briefly introduces the accompanying drawings required for describing the embodiments or the prior art. Apparently, the accompanying drawings in the following description show merely some embodiments of the present disclosed technology, and persons of ordinary skill in the art may still derive other drawings from these accompanying drawings without creative efforts.

Like reference numerals refer to corresponding parts throughout the several views of the drawings.

DETAILED DESCRIPTION

Reference will now be made in detail to embodiments, examples of which are illustrated in the accompanying drawings. In the following detailed description, numerous specific details are set forth in order to provide a thorough understanding of the subject matter presented herein. But it will be apparent to one skilled in the art that the subject matter may be practiced without these specific details. In other instances, well-known methods, procedures, components, and circuits have not been described in detail so as not to unnecessarily obscure aspects of the embodiments.

The following clearly and completely describes the technical solutions in the embodiments of the present application with reference to the accompanying drawings in the embodiments of the present application. Apparently, the described embodiments are merely a part rather than all of the embodiments of the present application. All other embodiments obtained by persons of ordinary skill in the art based on the embodiments of the present application without creative efforts shall fall within the protection scope of the present application.

Figure 1:
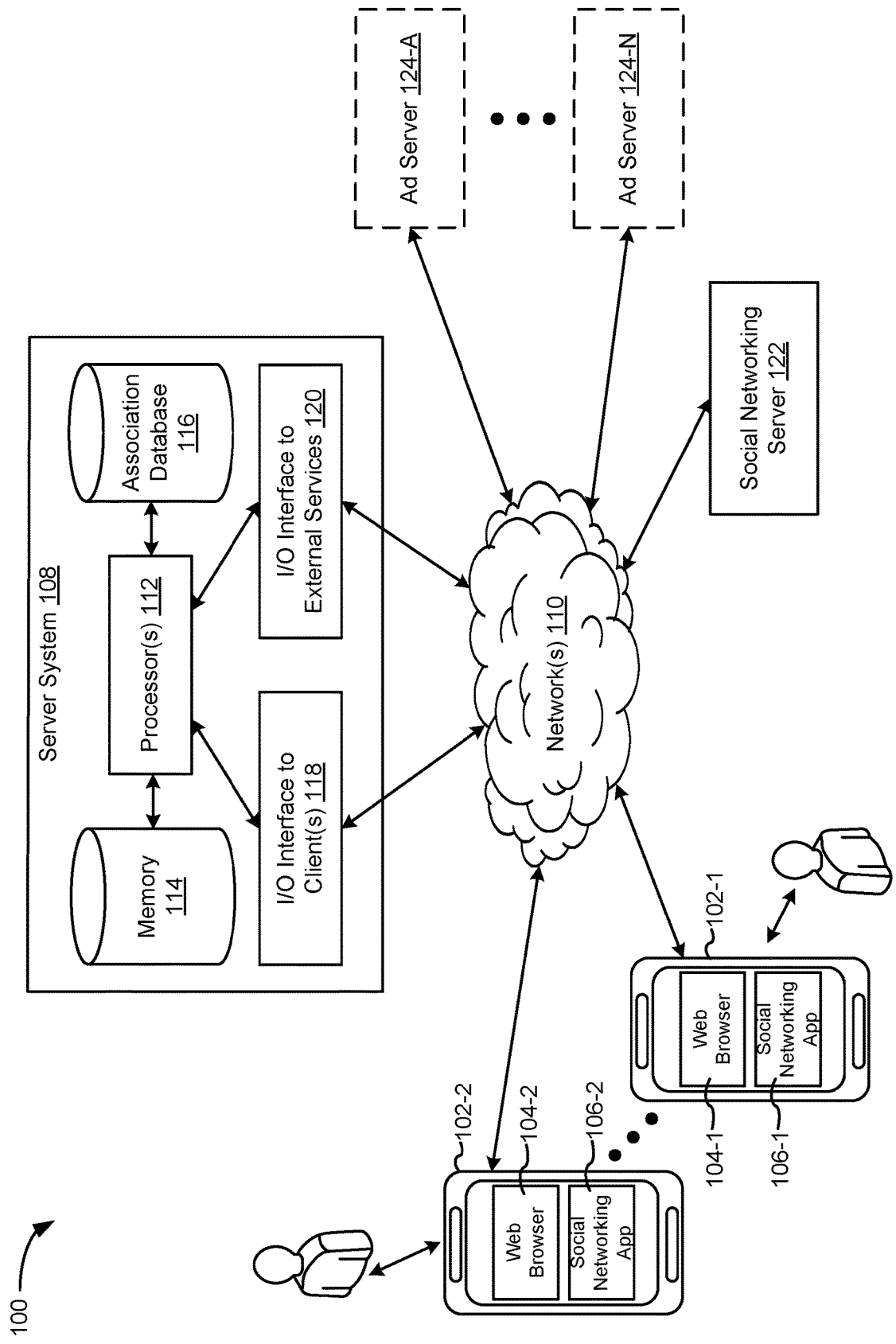
FIG. 1 is a block diagram of a server-client environment in accordance with some embodiments.

FIG. 1 illustrates a server-client environment 100 in accordance with some embodiments. In FIG. 1, first client device 102-1 is associated with a first user, and second client device 102-2 is associated with a second user. Client devices 102-1, 102-2 include a web browser 104-1, 104-2 and a social networking application 106-1, 106-2 for execution thereon. In some embodiments, a web browser 104 enables a client devices 102 to navigate, request (e.g., via HTTP), and display websites and web pages thereof. In some embodiments, a social networking applications 106 enables a client device to access a social networking platform and provides client-side processing and functionalities for the social networking platform. For example, the first user is able to access and navigate the social networking platform by executing social networking application 106-1 on first client device 102-1.

Examples of client device 102 include, but are not limited to, a handheld computer, a wearable computing device, a personal digital assistant (PDA), a tablet computer, a laptop computer, a desktop computer, a cellular telephone, a smart phone, an enhanced general packet radio service (EGPRS) mobile phone, a media player, a navigation device, a game console, a television, a remote control, or a combination of any two or more of these data processing devices or other data processing devices.

Examples of one or more networks 110 include local area networks (LAN) and wide area networks (WAN) such as the Internet. One or more networks 110 are, optionally, implemented using any known network protocol, including various wired or wireless protocols, such as Ethernet, Universal Serial Bus (USB), FIREWIRE, Long Term Evolution (LTE), Global System for Mobile Communications (GSM), Enhanced Data GSM Environment (EDGE), code division multiple access (CDMA), time division multiple access (TDMA), Bluetooth, Wi-Fi, voice over Internet Protocol (VoIP), Wi-MAX, or any other suitable communication protocol.

In some embodiments, social networking server 122 provides server-side data processing and functionalities for the social networking platform (e.g., social media network, instant messaging service, group chat service, message board service, message/news feed service, and the like). For example, social networking server 122 operates and manages the social networking platform that may be accessed by any number of client devices 102 through social networking application 106.

In some embodiments, server system 108 (i.e., a logo server) hosts one or more resources included on a plurality of websites that may be accessed by any number of client devices 102 through web browser 104. The plurality of websites at least include a logo picture hosted by server system 108. In some embodiments, the plurality of websites that include the logo picture are all associated with or owned by a common entity such as the entity providing the social networking server 122.

In some embodiments, server system 108 includes one or more processors 112, memory 114, association database 116, an I/O interface to one or more clients 118, and an I/O interface to external services 120. I/O interface to one or more clients 118 facilitates communications (e.g., HTTP get requests) with web browsers 104 executed on client devices 102. In some embodiments, memory 114 stores modules (i.e., programs, software, or computer code) for handling requests for a resource (i.e., a logo picture associated with a URL corresponding to server system 108) hosted by server system 108 and causing the provision of targeted advertisements to client devices 102. In some embodiments, association database 116 stores a plurality of entries, where a respective entry associates user identification information for the social networking platform with an electronic identifier generated for a client device 102, the user identification information is linked to a set of characteristics of the user of client device 102.

In some embodiments, I/O interface to the external services 120 facilitates communications with social networking server 122 and (optionally) advertisement (ad) servers 124-A, . . . , 124-N. In some embodiments, advertisement (ad) generator receives a request for an ad (e.g., a web resource associated with a URL that directs to the ad generator) from a client device 102 associated with a respective IP address and requests a set of characteristics from server system 108 (i.e., the logo server) corresponding to the respective IP address so as to serve targeted ads to client device 102 associated with a respective IP address. For example, the ad generator is a component of server system 108 (i.e., the logo server) that receives requests for serving ads associated with particular URLs. In another example, the ad generator is one of ad servers 124-A, . . . , 124-N, which are separate from server system 108 (i.e., the logo server).

Server system 108 is implemented on one or more standalone data processing apparatuses or a distributed network of computers. In some embodiments, server system 108 also employs various virtual devices and/or services of third party service providers (e.g., third-party cloud service providers) to provide the underlying computing resources and/or infrastructure resources of server system 108. Furthermore, social networking server 122 is implemented on one or more standalone data processing apparatuses or a distributed network of computers. In some embodiments, social networking server 122 also employs various virtual devices and/or services of third party service providers (e.g., third-party cloud service providers) to provide the underlying computing resources and/or infrastructure resources of social networking server 122.

In FIG. 1, server-client environment 100 includes both a client-side portion (e.g., social networking application 106-1, 106-2) and a server-side portion (e.g., social networking server 122) for the social networking platform. In some embodiments, data processing is implemented as a standalone application installed on client device 102 (e.g., social networking application 106). In addition, the division of functionalities between the client and server portions for the social networking platform can vary in different embodiments. For example, in some embodiments, social networking application 106 is a thin-client that provides only user-facing input and output processing functions, and delegates all other data processing functionalities to a backend server (e.g., social networking server 122).

Figure 2:
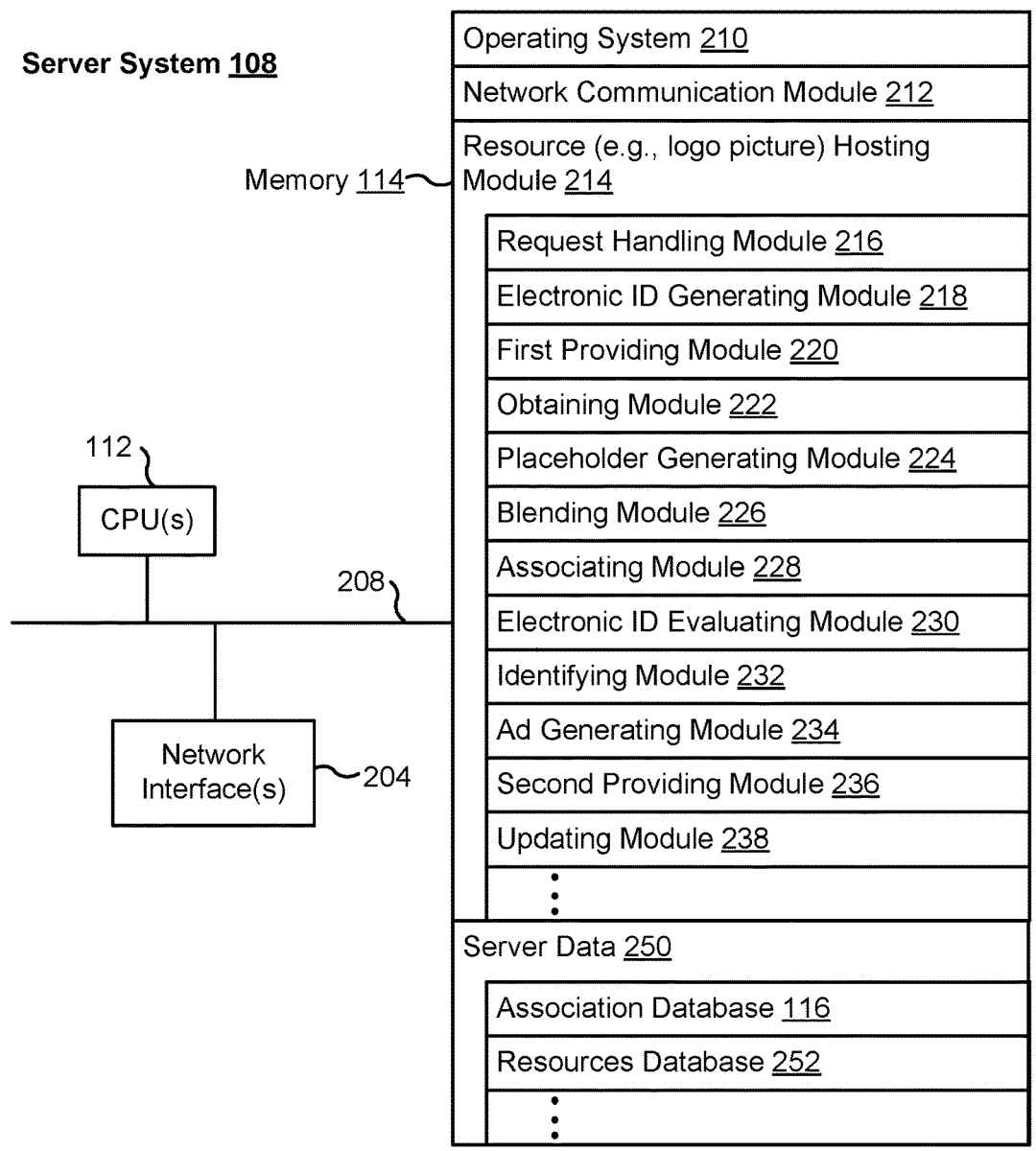
FIG. 2 is a block diagram of a server system in accordance with some embodiments.

FIG. 2 is a block diagram illustrating server system 108 (i.e., a logo server) that hosts one or more resources for a plurality of websites including a logo picture included on the plurality of websites in accordance with some embodiments. Server system 108, typically, includes one or more processing units (CPUs) 112, one or more network interfaces 204 (e.g., including I/O interface to one or more clients 118 and I/O interface to external service 120), memory 114, and one or more communication buses 208 for interconnecting these components (sometimes called a chipset). Memory 114 includes high-speed random access memory, such as DRAM, SRAM, DDR RAM, or other random access solid state memory devices; and, optionally, includes non-volatile memory, such as one or more magnetic disk storage devices, one or more optical disk storage devices, one or more flash memory devices, or one or more other non-volatile solid state storage devices. Memory 114, optionally, includes one or more storage devices remotely located from one or more processing units 112. Memory 114, or alternatively the non-volatile memory within memory 114, includes a non-transitory computer readable storage medium. In some implementations, memory 114, or the non-transitory computer readable storage medium of memory 114, stores the following programs, modules, and data structures, or a subset or superset thereof:

operating system 210 including procedures for handling various basic system services and for performing hardware dependent tasks;
 network communication module 212 for connecting server system 108 to other computing devices (e.g., client devices 102, social networking server 122, and (optionally) ad server(s) 124) connected to one or more networks 110 via one or more network interfaces 204 (wired or wireless);
 resource hosting module 214 which hosts one or more resources for a plurality of websites at least including a logo picture included on the plurality of websites, including but not limited to:
    request handling module 216 (a) for handling an initial request from a client device 102 for a logo picture hosted by server system 108 (e.g., an HTTP get request associated with a URL for the logo picture), where the initial request includes an IP address associated with client device 102, and (b) for handling a subsequent request from client device 102 for the logo picture hosted by server system 108, where the subsequent request includes an IP address associated with client device 102 and the electronic identifier for client device 102;
    electronic identifier (ID) generating module 218 for generating an electronic identifier (e.g., an e-tag) for client device 102 in response to the initial request;
    first providing module 220 for providing the logo picture and the electronic identifier to client device 102;
    obtaining module 222 for sending a request to the social networking server 122, which operates the social networking platform, for user identification information for the social networking platform that corresponds to the IP address in the initial request, and for obtaining said user identification information associated with the user of client device 102 when the user is currently logged into the social networking platform through the social networking application 106 executed on client device 102, where the user identification information is linked to a set of characteristics of the user;
    (optional) placeholder generating module 224 for generating a placeholder user account for user identification information when the IP address is not currently logged into the social networking platform;
    (optional) blending module 226 for generating a set of blended characteristics corresponding to the one or more user accounts of the social networking that have previously logged into the social networking platform under the IP address in the initial request;
    associating module 228 for storing an entry in association database 116 associating the user identification information with the electronic identifier for client device 102, where the user identification information is linked to the set of characteristics of the user of client device 102;

electronic identifier (ID) evaluating module 230 for determining whether the electronic identifier included in the subsequent request is up to date;

identifying module 232 for identifying the set of characteristics of the user according to the stored association between the electronic identifier and the user identification information for the social networking platform that corresponds to the user of client device 102 in response to the subsequent request;

advertisement (ad) generating module 234 for generating one or more advertisements based at least in part on the identified set of characteristics of the user;

second providing module 236 for providing the one or more generated advertisements to client device 102 and for providing the logo picture and a new electronic identifier when the electronic identifier included in the subsequent request is out of date; and (optional) updating module 238 for updating the user identification information when the electronic identifier is a temporary identifier and after receiving the subsequent request when; and server data 250, including but not limited to:

association database 116 storing a plurality of entries, where a respective entry associates user obtained identification information for the social networking platform with an electronic identifier generated for a client device 102, and the user identification information is linked to a set of characteristics of the user of client device 102 (See FIG. 5B and accompanying text for further discussion regarding association database 116); and resources database 252 storing one or more resource for the plurality of websites at least including the logo picture included on the plurality of websites.

Each of the above identified elements may be stored in one or more of the previously mentioned memory devices, and corresponds to a set of instructions for performing a function described above. The above identified modules or programs (i.e., sets of instructions) need not be implemented as separate software programs, procedures, or modules, and thus various subsets of these modules may be combined or otherwise re-arranged in various implementations. In some implementations, memory 114, optionally, stores a subset of the modules and data structures identified above. Furthermore, memory 114, optionally, stores additional modules and data structures not described above.

Figure 3:
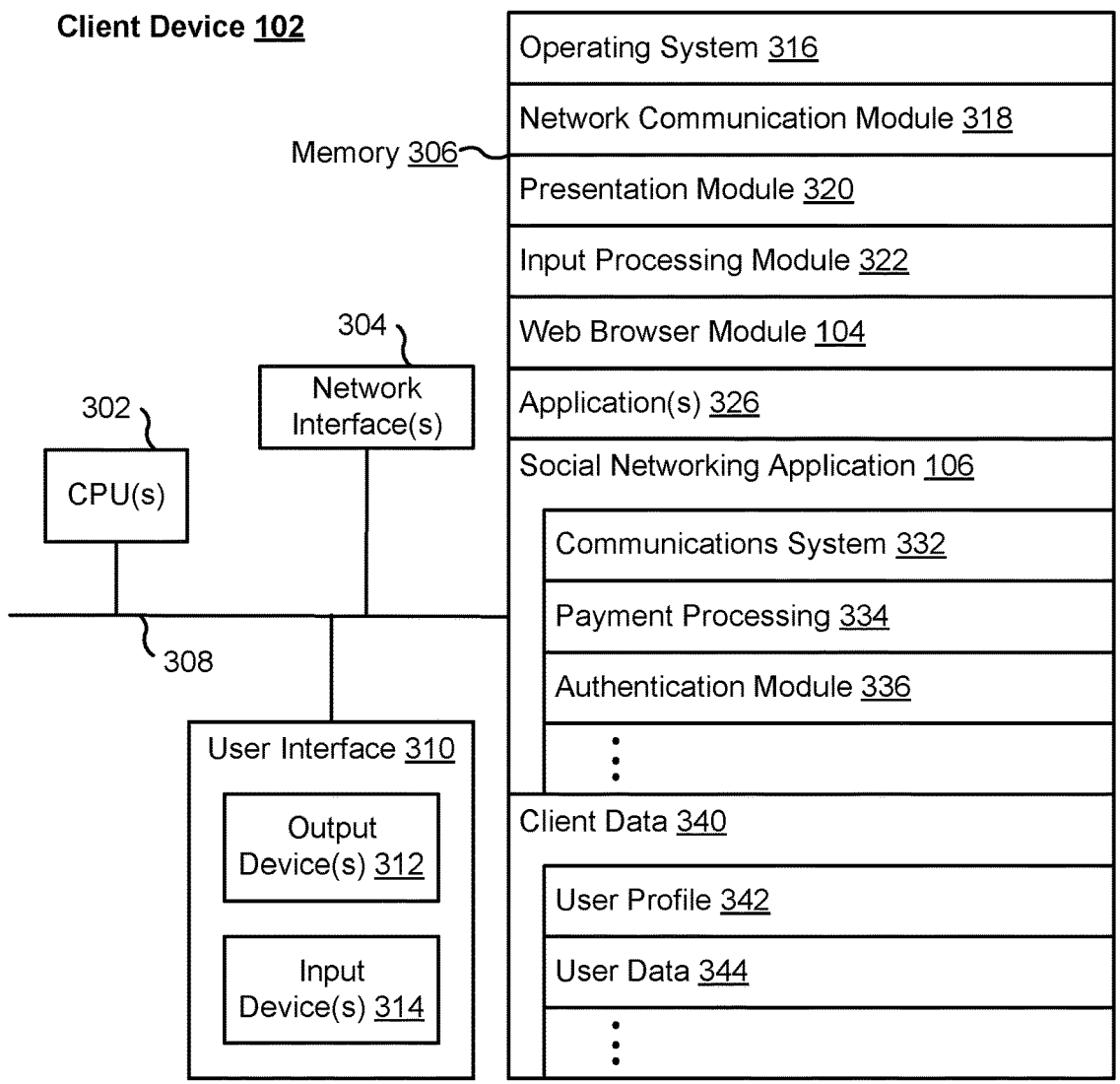
FIG. 3 is a block diagram of a client device in accordance with some embodiments.

FIG. 3 is a block diagram illustrating a representative client device 102 associated with a user in accordance with some embodiments. Client device 102, typically, includes one or more processing units (CPUs) 302, one or more network interfaces 304, memory 306, and one or more communication buses 308 for interconnecting these components (sometimes called a chipset). Client device 102 also includes a user interface 310. User interface 310 includes one or more output devices 312 that enable presentation of media content, including one or more speakers and/or one or more visual displays. User interface 310 also includes one or more input devices 314, including user interface components that facilitate user input such as a keyboard, a mouse, a voice-command input unit or microphone, a touch screen display, a touch-sensitive input pad, a camera, a gesture capturing camera, or other input buttons or controls. Furthermore, some client devices 102 use a microphone and voice recognition or a camera and gesture recognition to supplement or replace the keyboard. Memory 306 includes high-speed random access memory, such as DRAM, SRAM, DDR RAM, or other random access solid state memory devices; and, optionally, includes non-volatile memory, such as one or more magnetic disk storage devices, one or more optical disk storage devices, one or more flash memory devices, or one or more other non-volatile solid state storage devices. Memory 306, optionally, includes one or more storage devices remotely located from one or more processing units 302. Memory 306, or alternatively the non-volatile memory within memory 306, includes a non-transitory computer readable storage medium. In some implementations, memory 306, or the non-transitory computer readable storage medium of memory 306, stores the following programs, modules, and data structures, or a subset or superset thereof:

operating system 316 including procedures for handling various basic system services and for performing hardware dependent tasks;

network communication module 318 for connecting client device 102 to other computing devices (e.g., server system 108, social networking server 122, and (optionally) ad server(s) 124) connected to one or more networks 110 via one or more network interfaces 304 (wired or wireless);

presentation module 320 for enabling presentation of information (e.g., a user interface for a social networking platform, widget, websites or web pages thereof, game, and/or applications, audio and/or video content, text, etc.) at client device 102 via one or more output devices 312 (e.g., displays, speakers, etc.) associated with user interface 310;

input processing module 322 for detecting one or more user inputs or interactions from one of the one or more input devices 314 and interpreting the detected input(s) or interaction(s);

web browser module 104 (sometimes also herein called "web browser" or "browser") for navigating, requesting (e.g., via HTTP), and displaying websites and web pages thereof;

one or more applications 326 for execution by client device 102 (e.g., games, application marketplaces, payment platforms, and/or other online applications) or other non-web-based applications;

social networking application 106, which provides client-side data processing and functionalities for the social networking platform, including but not limited to:

communication system 332 for sending messages to and receiving messages from other users of the social networking platform (e.g., instant messaging, group chat, message board, message/news feed, and the like);

(optionally) payment processing 334 for processing payments associated with transactions initiated within the social networking platform or at a merchant's website within web browser module 104; and authentication module 336 for authenticating the user of client device 102 to access the social networking platform; and client data 340 storing data associated with the social networking platform, including but not limited to:

user profile 342 storing a user profile associated with the user of client device 102 including a user identifier (e.g., an account name or handle), login credentials to the social networking platform, (optionally) payment data (e.g., linked credit card information, app credit or gift card balance, billing address, shipping address, etc.), an IP address or preferred contact information, contacts list, custom parameters for the user (e.g., age, location, hobbies, etc.), and identified trends and/or likes/dislikes of the user; and user data 344 storing data authored, saved, liked, or chosen as favorites by the user of client device 102 in the social networking platform.

Each of the above identified elements may be stored in one or more of the previously mentioned memory devices, and corresponds to a set of instructions for performing a function described above. The above identified modules or programs (i.e., sets of instructions) need not be implemented as separate software programs, procedures, modules or data structures, and thus various subsets of these modules may be combined or otherwise re-arranged in various implementations. In some implementations, memory 306, optionally, stores a subset of the modules and data structures identified above. Furthermore, memory 306, optionally, stores additional modules and data structures not described above.

Figure 4:
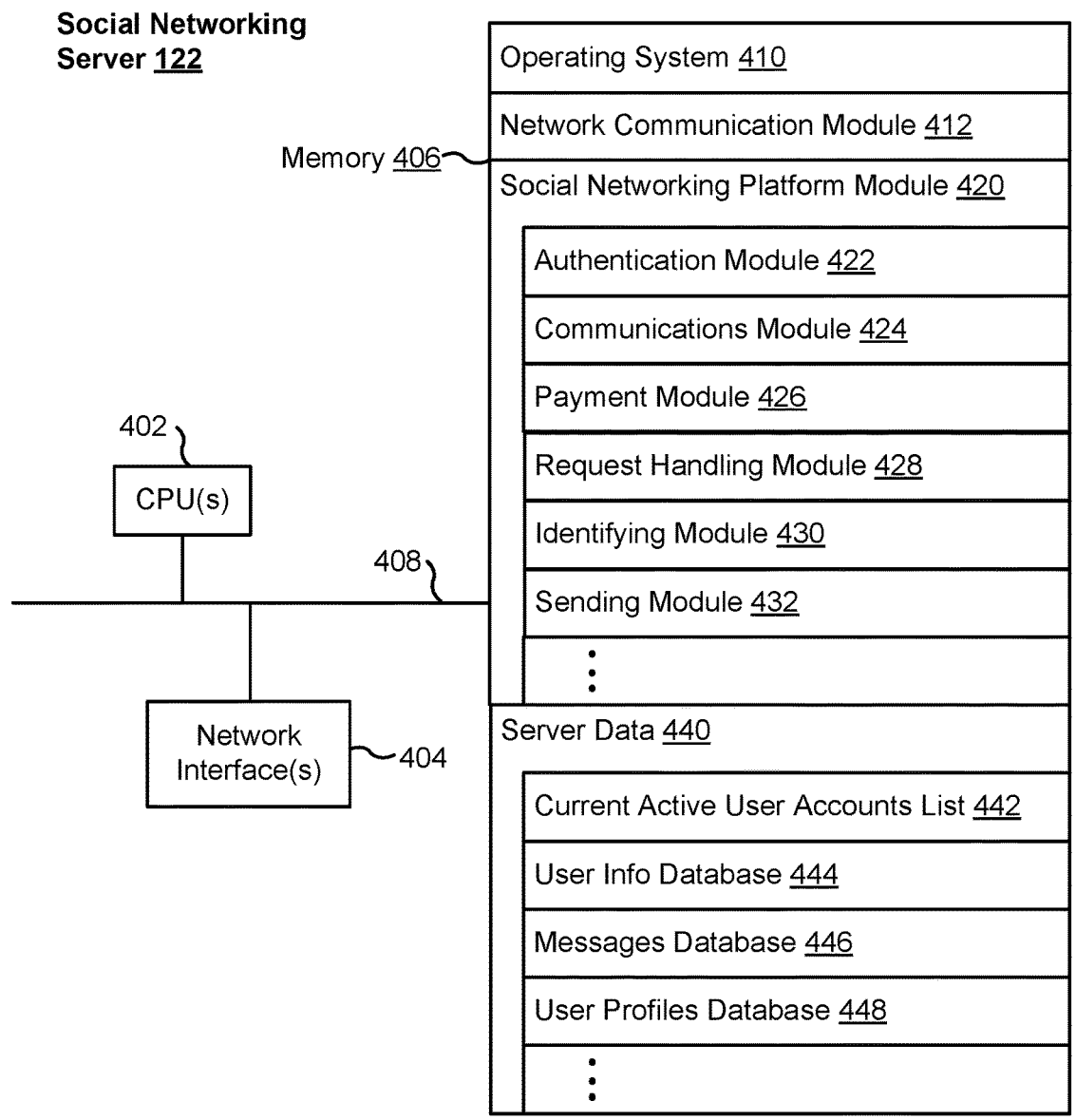
FIG. 4 is a block diagram of a social networking server in accordance with some embodiments.
Figures 5A, 5B:
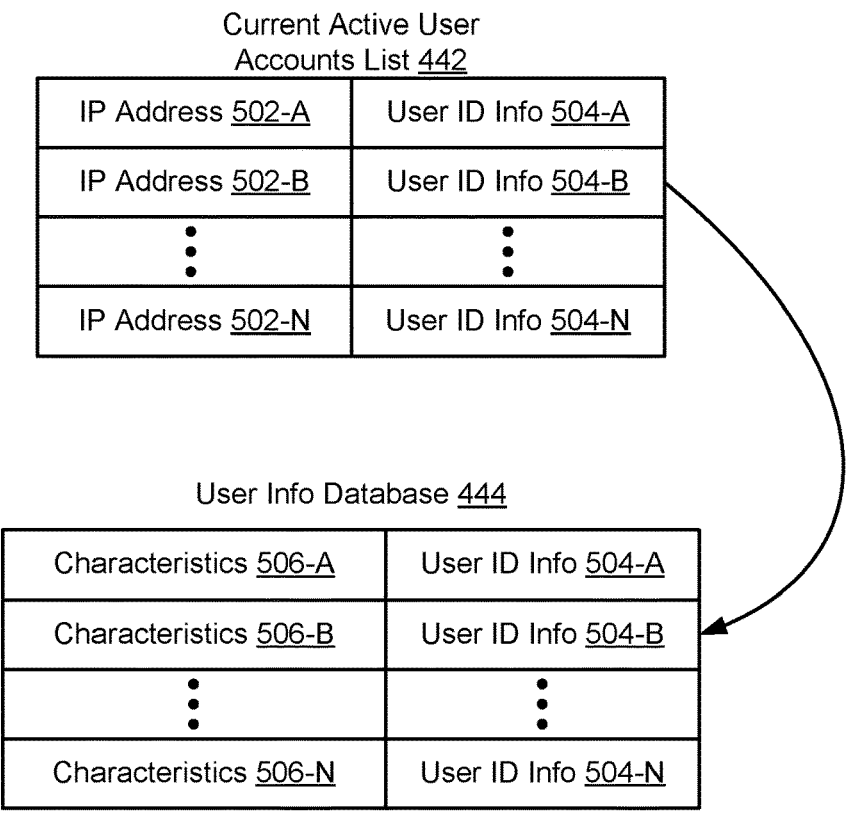
FIG. 5A is a block diagram of data structures maintained by the social networking server in accordance with some embodiments.
FIG. 5B is a block diagram of an association database in accordance with some embodiments.

FIG. 4 is a block diagram illustrating social networking server 122 in accordance with some embodiments. Social networking server 122, typically, includes one or more processing units (CPUs) 402, one or more network interfaces 404, memory 406, and one or more communication buses 408 for interconnecting these components (sometimes called a chipset). Memory 406 includes high-speed random access memory, such as DRAM, SRAM, DDR RAM, or other random access solid state memory devices; and, optionally, includes non-volatile memory, such as one or more magnetic disk storage devices, one or more optical disk storage devices, one or more flash memory devices, or one or more other non-volatile solid state storage devices. Memory 406, optionally, includes one or more storage devices remotely located from one or more processing units 402. Memory 406, or alternatively the non-volatile memory within memory 406, includes a non-transitory computer readable storage medium. In some implementations, memory 406, or the non-transitory computer readable storage medium of memory 406, stores the following programs, modules, and data structures, or a subset or superset thereof:

operating system 410 including procedures for handling various basic system services and for performing hardware dependent tasks;

network communication module 412 for connecting social networking server 122 to other computing devices (e.g., server system 108 and client devices 102) connected to one or more networks 110 via one or more network interfaces 404 (wired or wireless);

social networking platform module 420, which provides server-side data processing and functionalities for the social networking platform, including but not limited to:

authentication module 422 for authenticating the users client devices 102 to access the social networking platform;

communication system 424 for routing message sent by users of the social networking platform;

(optionally) payment module 426 for processing payments associated with transactions initiated by the users client devices 102;

request handling module 428 for receiving and responding to requests from server system 108 for user identification information for the social networking platform corresponding to an IP address;

identifying module 430 for identifying a user account currently logged into the social networking platform under the IP address included in the request based on current active user accounts list 442, or for identifying one or more user accounts that previously logged into the social networking platform under the IP address in the request if a user account is not currently logged into the social networking platform under the IP address in the request; and sending module 432 for sending user identification information and a set of characteristics associated with user account(s) identified by identifying module 430; and server data 440, including but not limited to:

current active user accounts list 442 indicating user accounts currently logged into the social networking platform (See FIG. 5A and accompanying text for further discussion regarding current active user accounts list 442);

user information database 444 storing user identification information and linked a set of characteristics for each user account registered with the social networking platform (See FIG. 5A and accompanying text for further discussion regarding user information database 444);

messages database 446 storing messages sent by users in the social networking platform; and profiles database 448 storing user profiles for users of the social networking platform, where a respective user profile for a user includes a user identifier (e.g., an account name or handle), login credentials to the social networking platform, (optionally) payment data (e.g., linked credit card information, app credit or gift card balance, billing address, shipping address, etc.), an IP address or preferred contact information, contacts list, custom parameters for the user (e.g., age, location, hobbies, etc.), and identified trends and/or likes/dislikes of the user.

Each of the above identified elements may be stored in one or more of the previously mentioned memory devices, and corresponds to a set of instructions for performing a function described above. The above identified modules or programs (i.e., sets of instructions) need not be implemented as separate software programs, procedures, or modules, and thus various subsets of these modules may be combined or otherwise re-arranged in various implementations. In some implementations, memory 406, optionally, stores a subset of the modules and data structures identified above. Furthermore, memory 406, optionally, stores additional modules and data structures not described above.

In some embodiments, at least some of the functions of server system 108 are performed by social networking server 122, and the corresponding sub-modules of these functions may be located within social networking server 122 rather than server system 108. For example, in some embodiments, resource hosting module 214 may be implemented at least in part by social networking server 122. In some embodiments, at least some of the functions of social networking server 122 are performed by server system 108, and the corresponding sub-modules of these functions may be located within server system 108 rather than social networking server 122. For example, in some embodiments, social networking platform module 420 may be implemented at least in part by server system 108. Social networking server 122 and server system 108 shown in FIGS. 2 and 4, respectively, are merely illustrative, and different configurations of the modules for implementing the functions described herein are possible in various embodiments.

In some embodiments, at least some of the functions of social networking platform module 420 are performed by social networking application 106, and the corresponding sub-modules of these functions may be located within client device 102 rather than social networking server 122. In some embodiments, at least some of the functions of social networking application 106 are performed by social networking platform module 420, and the corresponding sub-modules of these functions may be located within social networking server 122 rather than client device 102. Client device 102 and social networking server 122 shown in FIGS. 3-4, respectively, are merely illustrative, and different configurations of the modules for implementing the functions described herein are possible in various embodiments.

FIG. 5A is a block diagram of data structures maintained by social networking server 122 in accordance with some embodiments. In some embodiments, social networking server 122 (FIGS. 1 and 4) operates and manages a social networking platform and also maintains current active user accounts list 442 and user information database 444.

In some embodiments, current active user accounts list 442 indicates user accounts currently logged into the social networking platform. In FIG. 5A, current active user accounts list 442 includes an entry for each user account currently logged onto the social networking platform. In FIG. 5A, each entry of current active user accounts list 442 includes an IP address 502 under which a client device 102 is logged into the social networking platform and user identification information 504 corresponding to the user account that client device 102 is logged into the social networking platform. For example, user identification information 504 includes a session identifier or the user account name or handle under which the user of client device 102 is logged into the social networking platform.

In some embodiments, user information database 444 includes an entry for each user account registered with the social networking platform. In FIG. 5A, a respective entry of user information database 444 correlates a set of characteristics 506 with user identification information 504 (i.e., a user account of the social networking platform). For example, a respective set of characteristics 506 is derived from a user profile stored in user profiles database 448 (FIG. 4) that corresponds to a user account based on information (e.g., biographic information, demographic information, a pattern of use, and/or the like) collected during registration of the user account or over time with usage of the user account.

FIG. 5B is a block diagram of an association database 116 in accordance with some embodiments. In some embodiments, server system 108 maintains association database 116 in order to provide targeted advertisements to client devices 102 that visit websites that include the logo picture hosted by server system 108.

In some embodiments, association database 116 includes a plurality of entries each associated with an electronic identifier generated by server system 108. For example, in response to an initial request for the logo picture from a client device 102, server system 108 generates an electronic identifier (ID) 556. The electronic identifier 556 is associated the IP address 552 of client device 102 that sent the initial request. Subsequently, server system 108 sends a request to social networking server 122 for characteristics associated with client device 102. Social networking server 122 determines whether a user account is currently logged into the social networking platform under the IP address 552.

If a user account is currently logged into the social networking platform under the IP address 552, social networking server 122 returns user identification information 556 for the currently logged in user account and also a set of characteristics 558 corresponding to the currently logged in user account.

Thereafter, server system 108 associates user identification information 556 with electronic identifier 554 by generating a respective entry in association database 116 that includes the IP address 552, the electronic identifier 554, the received user identification information 556, and the set of characteristics 558. Then, for example, if server system 108 receives a subsequent request from client device 102 for the logo picture that includes the electronic identifier, server system 108 is able to search association database 116 for the set of characteristics 558 that are included in the entry for the electronic identifier 554 and provide advertisements to client device 102 that are targeted to the user of client device 102 based at least in part on the set of characteristics 558.

Figure 6A:
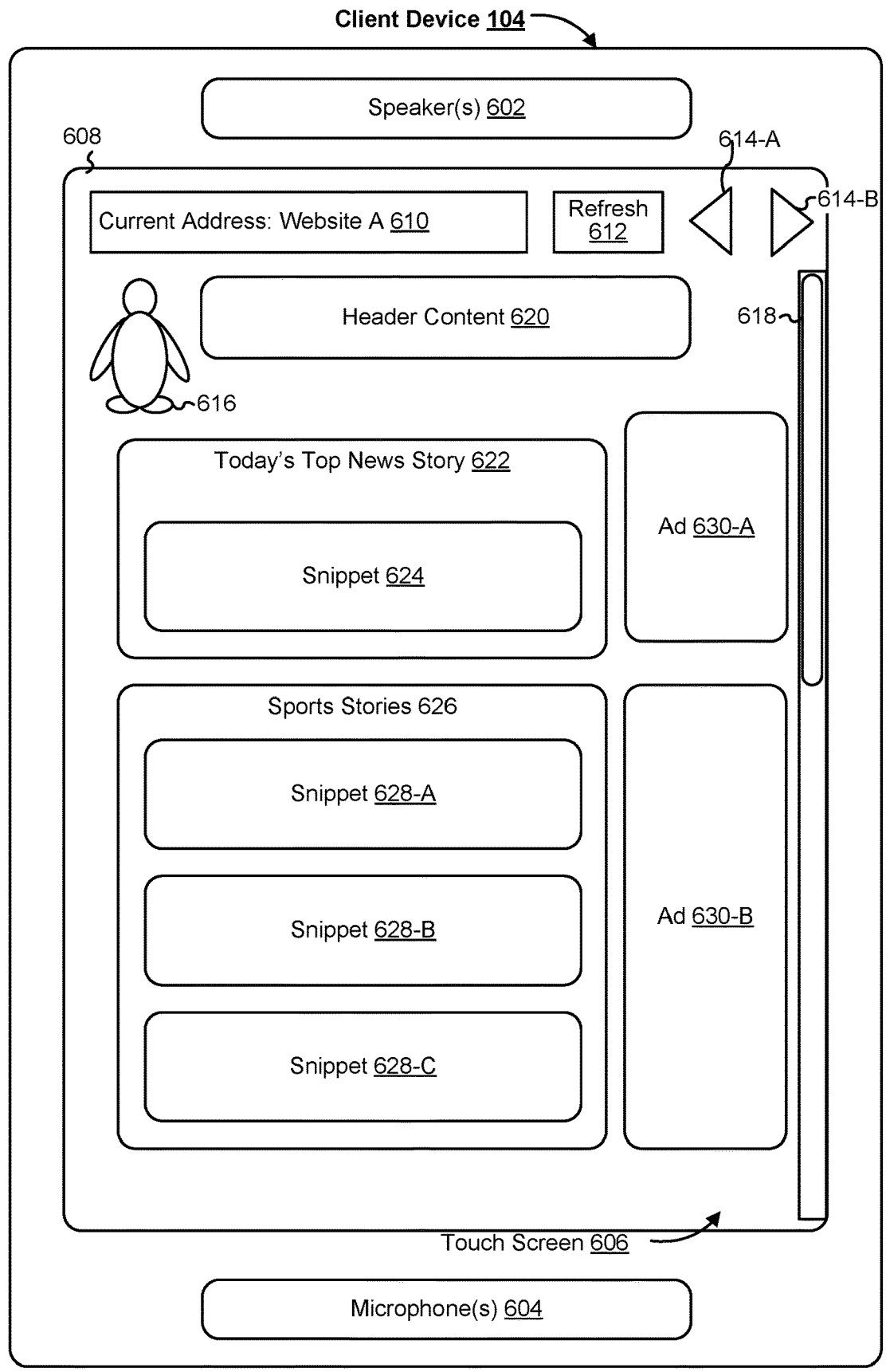
FIGS. 6A-6B illustrate exemplary user interfaces for websites including a logo picture in accordance with some embodiments.
Figure 6B:
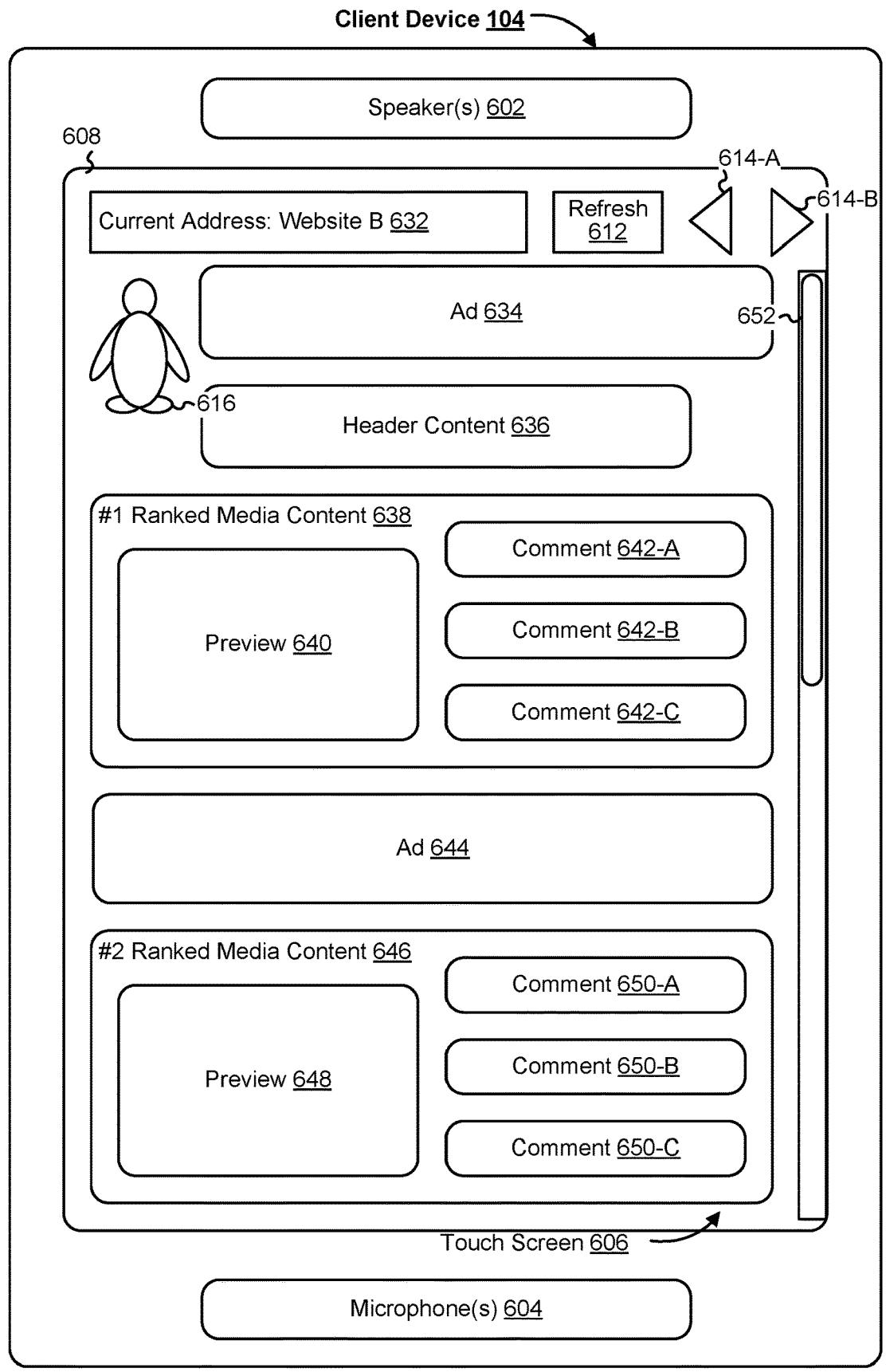

Attention is now directed towards embodiments of user interfaces and associated processes that may be implemented on a client device 102 with one or more speakers 602, one or more microphones 604, and a touch screen 606 (sometimes also herein called a "touch screen display") enabled to receive one or more touch inputs and display information (e.g., media content, websites and web pages thereof, and/or user interfaces for an application such as a web browser or the social networking platform). FIGS. 6A-6B show a user interface 608 displayed on client device 102 (e.g., a mobile phone) for websites including a logo picture; however, one skilled in the art will appreciate that the user interfaces shown in FIGS. 6A-6B may be implemented on other similar computing devices. The user interfaces in FIGS. 6A-6B are used to illustrate the processes described herein.

FIG. 6A illustrates client device 102 executing a web browser (e.g., web browser 104, FIGS. 1 and 3). In FIG. 6A, the web browser is displaying a landing page for a first website 610 (e.g., website A) on touch screen 606. For example, website A is a news aggregation outlet. In FIG. 6A, the web browser includes a current address bar showing a URL for the landing page of the first website 610 as the current web address, refresh affordance 612 for reloading the current web page, back navigation affordance 614-A for displaying the last web page, and forward navigation affordance 614-B for displaying the next web page.

In FIG. 6A, the landing page for the first website 610 includes a logo picture 616 that is hosted by server system 108. In FIG. 6A, the landing page for the first website 610 also includes header content 620 (e.g., the name of the website A), a first visible content section corresponding to "Today's Top News Stories" 622 with a snippet or preview 624 of the top story, a second visible content section corresponding to "Sports Stories" 622 with snippets 628-A, 628-B, and 628-C for distinct sports stories, and a scroll bar 618 for viewing the balance of the content sections that are provided on the landing page of the first website 610. In FIG. 6A, the landing page for the first website 610 further includes advertisements 630-A and 630-B. In some embodiments, advertisements 630-A and 630-B are provided by server system 108 and/or ad servers 124.

FIG. 6B illustrates client device 102 executing a web browser (e.g., web browser 104, FIGS. 1 and 3). In FIG. 6B, the web browser is displaying a landing page for a second website 632 (e.g., website B) on touch screen 606. For example, website B is a media content outlet that ranks media items (e.g., pictures, videos, and the like) according to user comments and votes. In FIG. 6B, the web browser includes a current address bar showing a URL for the landing page of the second website 632 as the current web address.

In FIG. 6B, the landing page for the second website 632 includes the logo picture 616 that is hosted by server system 108, which was also included on the first website 610 in FIG. 6A. In FIG. 6B, the landing page for the second website 632 also includes a banner advertisement 634 and header content 636 (e.g., the name of the website B). In FIG. 6B, the landing page for the second website 632 also includes a first media content section 638 corresponding to a number 1 ranked media item, a second media content section 646 corresponding to a number 2 ranked media item, and an advertisement 644 positioned between the first media content section 638 and the second media content section 646. In FIG. 6B, the first media content section 638 includes a preview 640 of the number 1 ranked media item and comments 642-A, 642-B, and 642-C related to the number 1 ranked media item. In FIG. 6B, the second media content section 646 includes a preview 648 of the number 2 ranked media item and comments 650-A, 650-B, and 650-C related to the number 2 ranked media item. In FIG. 6B, the landing page for the second website 632 further includes a scroll bar 652 for viewing the top N ranked media items on the landing page of the second website 632. In some embodiments, advertisements 634 and 644 are provided by server system 108 and/or ad servers 124.

Figure 7:
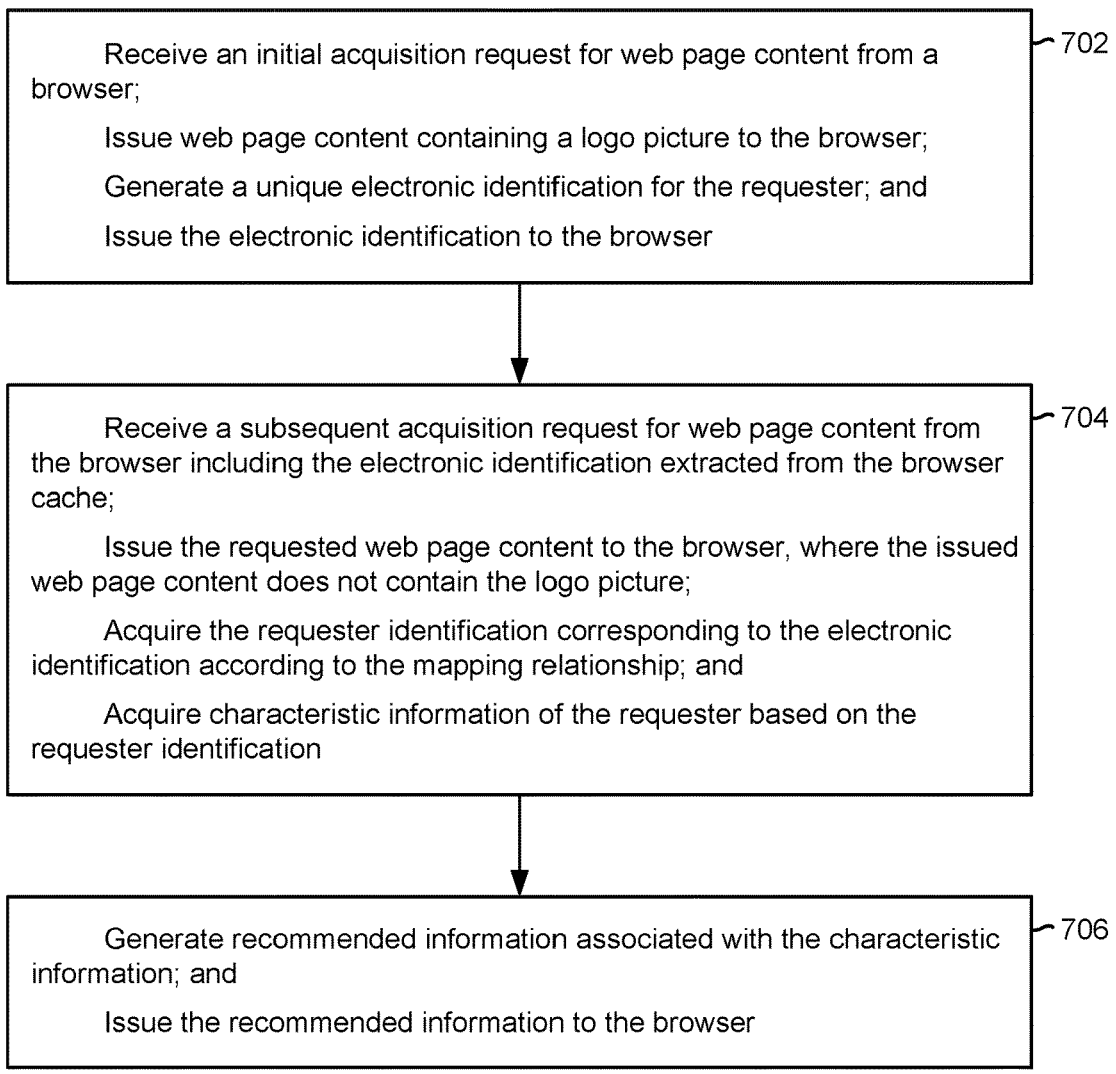
FIG. 7 illustrates a flowchart diagram of a method of issuing recommended information in accordance with some embodiments.

FIG. 7 illustrates a flowchart diagram of a method 700 of issuing recommended information (i.e., targeted advertisements) in accordance with some embodiments. In some embodiments, method 700 is performed by a server with one or more processors and memory. For example, in some embodiments, method 700 is performed by server system 108 (FIGS. 1-2) or a component thereof (e.g., resource hosting module 214, FIGS. 1-2). In some embodiments, method 700 is governed by instructions that are stored in a non-transitory computer readable storage medium and the instructions are executed by one or more processors of the server.

Step 702: The server receives an initial acquisition request for web page content from a browser, issues the web page content containing a logo picture to the browser, generates a unique electronic identification for the requestor, and issues the electronic identification to the browser.

In some embodiments, after receiving the web page content and the electronic identification from the server, the web browser (e.g., web browser 104 executed on a client device 102, see FIGS. 1 and 3) stores the electronic identification in the browser cache corresponding to the logo picture. Once the electronic identification is stored in the browser cache, the corresponding logo picture is stored. After the electronic identification is acquired, the unique requestor identification corresponding to the electronic identification can be determined.

In some embodiments, the server establishes and stores a mapping relationship between the electronic identification and requestor identification. Multiple manners of establishing the mapping relationship between the electronic identification and the requestor identification are discussed herein.

In a first embodiment, when the requestor uses requestor identification (e.g., user identification information such as a user name or handle corresponding to a user account registered with a social networking platform) to log into a social networking platform, the server may immediately acquire the requestor identification so as to establish the mapping relationship.

In some embodiments, the server determines whether the requestor is currently logged into the social networking platform under the requestor identification. If the requestor is currently logged into the social networking platform under the requestor identification, the requestor identification is acquired by the server, and the mapping relationship between the electronic identification and the requestor identification is established.

In a second embodiment, when the requestor is not currently logged into the social networking platform, the server cannot immediately acquire the requestor identification. Instead, the server can only acquire the requestor identification through other indirect information so as to establish the mapping relationship. For example, the mapping relationship is established through the current IP address of the requestor.

In some embodiments, after the server determines that the requestor is not currently logged into the social networking platform, the server acquires the current IP address of the requestor. Then, the server determines requestor identification corresponding to the current IP address, and the server establishes the mapping relationship between the electronic identification and the requestor identification. In practical application, the mapping relationship may further comprise the IP address. As such, the server established a mapping relationship between the electronic identification, the requestor identification, and the IP address.

In some embodiments, the server determines the requestor identification corresponding to the current IP address according to the log in habit or log in history of the requestor. For example, when the requestor has repeatedly used a respective IP address to log into the social networking platform in the past, the server can identify the requestor identification if the acquired IP address matches the respective IP address that has been frequently used in the past to log into the social networking platform. In some embodiments, the relationship between the IP address and the requestor identification is saved in an IP library of the social networking platform (e.g., an instant messaging service).

Step 704: The server receives a subsequent acquisition request for the web page content from the browser including the electronic identification extracted from the browser cache, issues the requested web page content to the browser, where the issued web page content does not contain the logo picture, acquires the requestor identification corresponding to the electronic identification according to the mapping relationship, and acquires characteristic information of the requestor based on the requestor identification.

In some embodiments, the server receives the subsequent acquisition request for web page content from the browser, identifies the logo picture contained in the requested web page, and sends an electronic identification extracting request to the browser. In response to the extracting request, the browser extracts the electronic identification from the browser cache, and sends the electronic identification to the server. Then, the browser extracts the logo picture corresponding to the electronic identification from the browser cache, and displays the logo picture in the received web page content.

In some embodiments, the server stores registration information for each user account of the social networking platform, where the registration information comprises the requestor identification (e.g., a user name or handle corresponding to a user account registered with a social networking platform) and the characteristic information of the requestor. The characteristic information of the requestor is linked to the requestor identification. In some embodiments, the characteristic information is derived from a user profile corresponding to the user account indicating information such as the gender, age, hobbies, and the likes and/or dislikes of the requestor.

Step 706: The server generates recommended information associated with the characteristic information and issues the recommended information to the browser. After the server identifies the characteristic information of the requestor, the server generates recommended information matching the characteristic information. In some embodiments, the characteristic information can be used as key word(s) to search for recommended information containing the key word(s) so as to issue recommended information to the browser for display that is targeted based on the characteristic information.

It should be understood that the particular order in which the operations in FIG. 7 have been described is merely exemplary and is not intended to indicate that the described order is the only order in which the operations could be performed. One of ordinary skill in the art would recognize various ways to reorder the operations described herein. Additionally, it should be noted that details of other processes described herein with respect to other methods described herein (e.g., methods 800 and 1000) are also applicable in an analogous manner to method 700 described above with respect to FIG. 7.

Figure 8A:
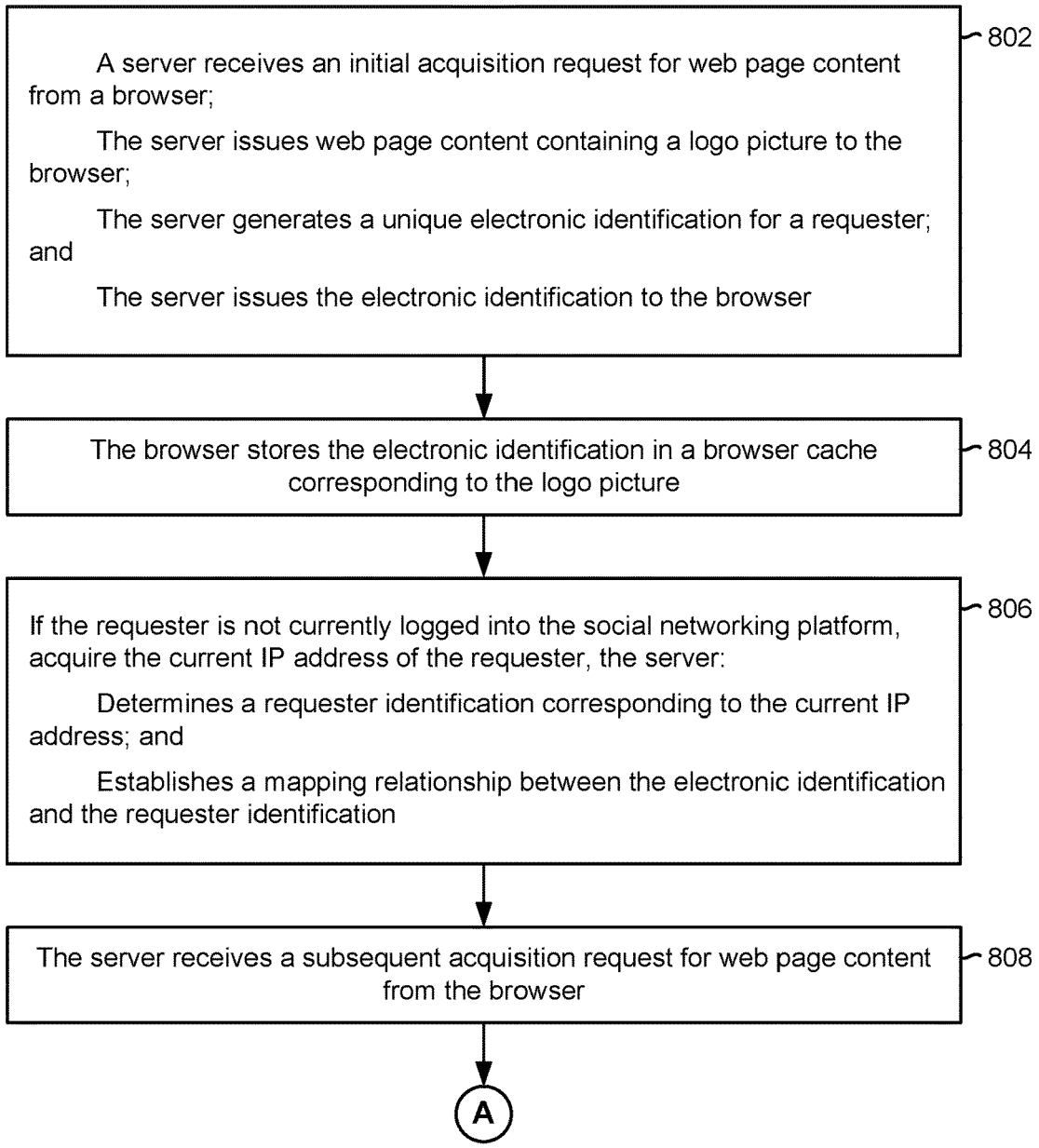
FIGS. 8A-8B illustrate a flowchart diagram of a method of issuing recommended information in accordance with some embodiments.
Figure 8B:
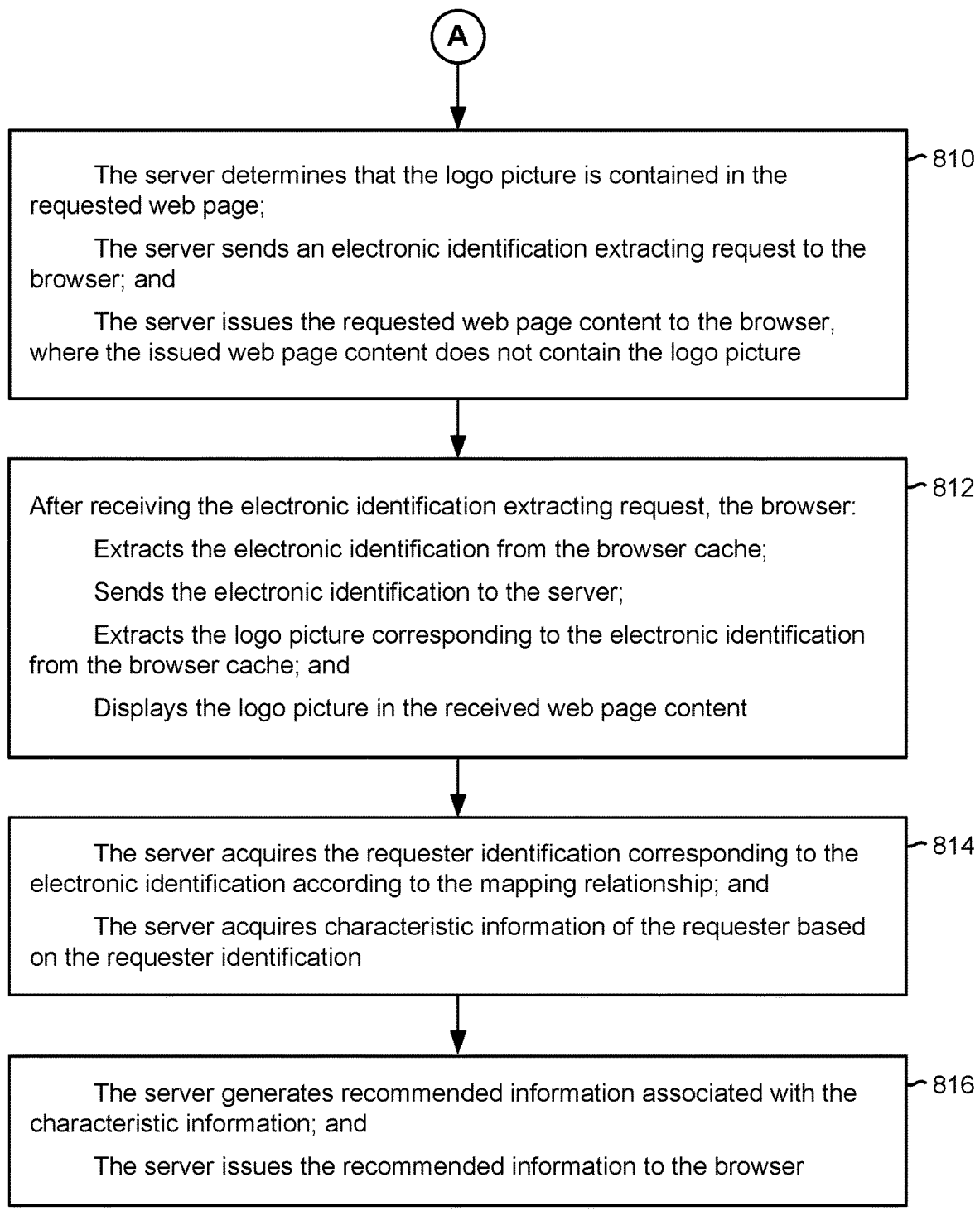

FIGS. 8A-8B illustrates a flowchart diagram of a method 800 of issuing recommended information (i.e., targeted advertisements) in accordance with some embodiments. In some embodiments, method 800 is performed by a server with one or more processors and memory and a browser executed on a client device with one or more processors and memory. For example, in some embodiments, method 800 is performed at least in part by server system 108 (FIGS. 1-2) or a component thereof (e.g., resource hosting module 214, FIGS. 1-2) and also by client device 102 (FIGS. 1 and 3) or a component thereof (e.g., web browser module, FIGS. 1 and 3).

Step 802: The server receives an initial acquisition request for web page content from a browser, issues the web page content containing a logo picture to the browser, generates a unique electronic identification for the requestor, and issues the electronic identification to the browser.

Step 804: The browser stores the electronic identification in a browser cache corresponding to the logo picture.

Step 806: If the requestor is not currently logged into the social networking platform, the server acquires the current IP address of the requestor, and the server: determines a requestor identification corresponding to the current IP address; and establishes a mapping relationship between the electronic identification and the requestor identification As an example, the social networking platform provided by the server is an instant messaging service and each web page for instant messaging service contains an instant messaging logo icon, where the logo icon can be used as a logo picture. In a first example, firstly, the requestor logs into an instant messaging application executed on a mobile device that is associated with the instant messaging service with his/her user account and, then, visits a news web page by following a link in the instant messaging application. Alternatively, the requestor first visits the news web page and, then, logs into the instant messaging application with his/her user account based on the news web page. In this way, the server can determine that the requestor is currently logged into the instant messaging service under his/her user account. In a second example, the requestor visits the news web page and does not log into the instant messaging service with his/her user account. Thus, the server acquires the current IP address of the requestor and identifies a corresponding user account for the instant messaging service based on the IP address. Subsequently, the server establishes a mapping relationship between the electronic identification, the user account for the instant messaging service, and the IP address.

Afterwards, if the user re-visits the news web page or other web pages of instant messaging service, such as an entertainment section, the server determines the user account for the instant messaging service by tracking the electronic identification stored in the browser cache regardless of whether the requestor is currently logged into the instant messaging service. Later, the server generates recommended information matching characteristic information of the requestor that recorded during registration of the user account for the instant messaging service, and the server issues the recommended information to the browser for display. The foregoing example is discussed with reference to an instant messaging service but the application is not limited to the above example.

Step 808: The server receives a subsequent acquisition request for web page content from the browser. For example, the browser sends an access (Get) request (i.e., the subsequent acquisition request) to a server of a visited website. The server sends head information, which indicates a browser cache is available, and the web page content containing no logo picture to the browser. After receiving the head information, the browser knows that the logo picture stored in the browser cache is available, browser extracts the logo picture so as to subsequently display the logo picture in the received web page content, extracts an electronic identification corresponding to the logo picture from the browser cache, and provides the electronic identification to the server.

Step 810: The server determines that the logo picture is contained in the requested web page, sends an electronic identification extracting request to the browser, and issues the requested web page content to the browser, where the issued web page content does not contain the logo picture.

Step 812: After receiving the electronic identification extracting request, the browser extracts the electronic identification from the browser cache, sends the electronic identification to the server, extracts the logo picture corresponding to the electronic identification from the browser cache, and displays the logo picture in the received web page content.

Step 814: The server acquires the requestor identification corresponding to the electronic identification according to the mapping relationship, and acquires characteristic information of the requestor based on the requestor identification.

Step 816: The server generates recommended information associated with the characteristic information and issues the recommended information to the browser.

For example, with respect to a certain service, websites A and B provide web page services. The user uses a user ID M to log into and visit website A. In this example, website A contains the logo picture, and the server generates a corresponding electronic identification Q for the user ID M. Accordingly, the browser stores the logo picture and the electronic identification in the browser cache, then the user exits website A. Meanwhile, the server establishes a mapping relationship between the user ID M and the electronic identification Q.

Later, the user visits the website B or revisits the website A. At this time, regardless of whether the user logs in, the server is able to determine corresponding user ID M by tracking the electronic identification Q stored in the browser cache. As such, the requestor information of the user ID M is acquired. Then, the server generates the recommended information matching with the relevant information based on characteristic information recorded during registration of user ID M, and server issues the recommended information to the browser for display.

In this embodiment, tracking is preformed based on the logo picture in the web page. If the requested web page contains the logo picture, then a unique electronic identification is generated for the requestor; moreover, the logo picture and the electronic identification are stored in the browser cache. If the web page containing the logo picture is subsequently requested, then the electronic identification in the browser cache is acquired so as to determine a requestor identification, and thus determine the matched recommended information, and issue the recommended information to the requestor. In this way, accurate user identification can be performed without cookie tracking, so as to issue recommended information targeted to the identified user.

It should be understood that the particular order in which the operations in FIGS. 8A-8B have been described is merely exemplary and is not intended to indicate that the described order is the only order in which the operations could be performed. One of ordinary skill in the art would recognize various ways to reorder the operations described herein. Additionally, it should be noted that details of other processes described herein with respect to other methods described herein (e.g., methods 700 and 1000) are also applicable in an analogous manner to method 800 described above with respect to FIGS. 8A-8B.

Figure 9A:
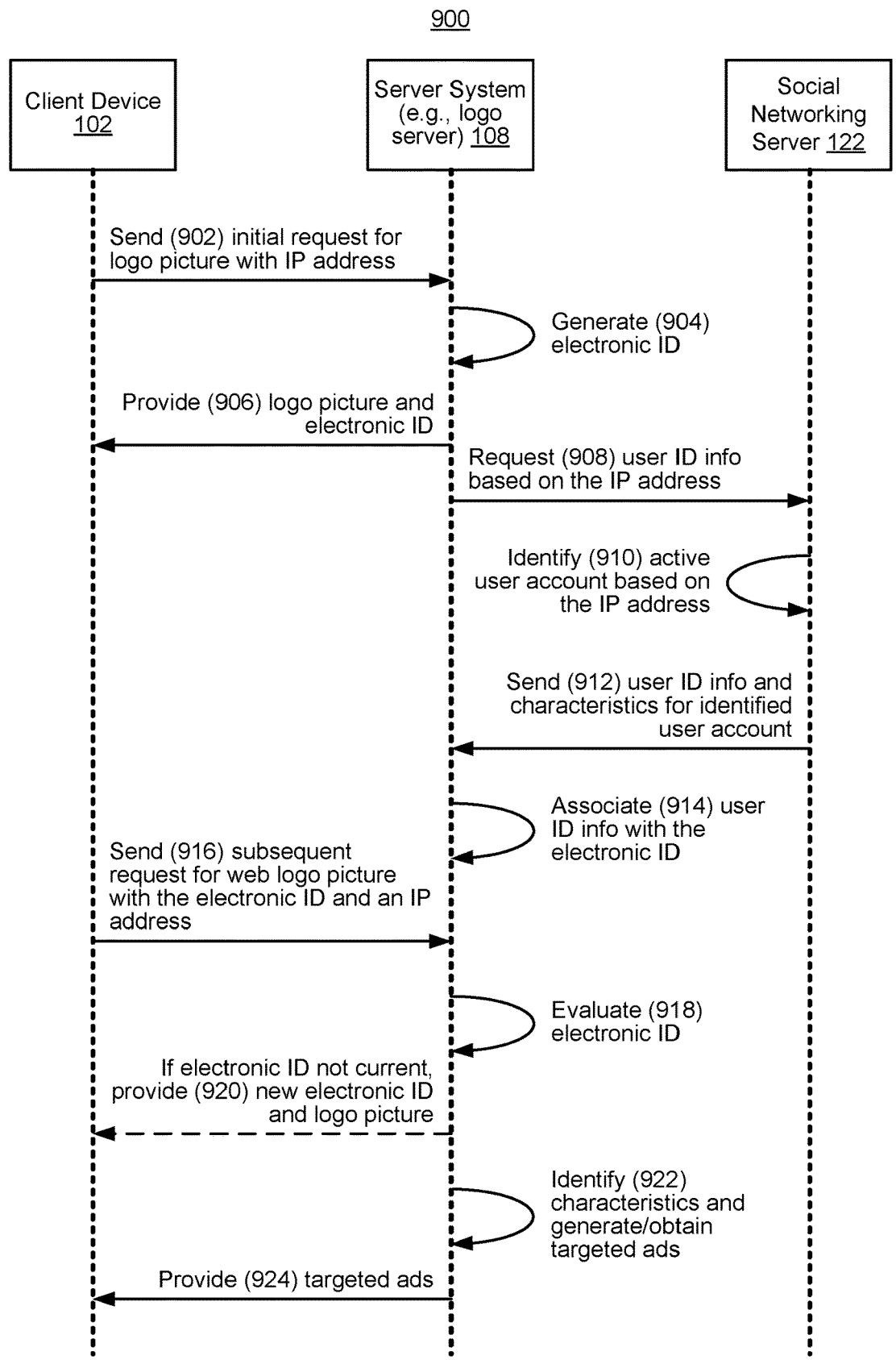
FIG. 9A illustrates a schematic flow diagram of a process for providing targeted advertisements in accordance with some embodiments.

FIG. 9A illustrates a schematic flow diagram of a process 900 for providing targeted advertisements in accordance with some embodiments. In some embodiments, process 900 is performed in server-client environment 100 with a respective client device 102 (FIGS. 1 and 3), server system 108 (FIGS. 1-2), and social networking server 122 (FIGS. 1 and 4). In some embodiments, server system 108 (i.e., a logo server) hosts one or more resources included on a plurality of websites that may be accessed by any number of client devices 102 through web browser 104. The plurality of websites at least include a logo picture hosted by server system 108. In some embodiments, the plurality of websites that include the logo picture are all associated with or owned by a common entity such as the entity providing a social networking platform (e.g., the entity associated with social networking server 122). In some embodiments, social networking server 122 manages and operates a social networking platform which the user of respective client device 102 can access via social networking application 106 (FIGS. 1 and 3).

Client device 102 sends (902) an initial request for a logo picture to server system 108 (i.e., the logo server) with an IP address. For example, the initial request is an HTTP get request for the logo picture, which is associated with a URL.

In response to receiving the initial request, server system 108 generates (904) an electronic identifier for client device 102.

After generating the electronic identifier for client device 102, server system 108 provides (906) the logo picture and the electronic identifier to client device 102.

After receiving the initial request, server system 108 requests (908) user identification information from social networking server 122 based on the IP address included in the initial request to server system 108.

In response to the request from server system 108, social networking server 122 identifies (910) an active user account currently logged into the social networking platform under the IP address.

Social networking server 122 sends (912) user identification information and a set of characteristics linked to the identified active user account.

After receiving the user identification information and the set of characteristics, server system 108 associates (914) the user identification information with the electronic identifier generated in operation 904 for client device 102. For example, server system 108 stores an entry in association database 116 (FIG. 5B) associating the electronic identifier with the user identification and the set of characteristics.

At a time subsequent to operation 914, client device 102 sends (916) a subsequent request for the logo picture to server system 108 with the electronic identifier and an IP address.

After receiving the subsequent request, server system 108 evaluates (918) the electronic identifier included in the subsequent request.

In accordance with a determination that the electronic identifier included in the subsequent request is not current, server system 108 generates a new electronic identifier for client device 102 and sends (920) the new electronic identifier and the logo picture to client device 102.

After receiving the subsequent request, server system 108 identifies (922) the set of characteristics for the user of client device 102 based on the association formed in operation 914 between the electronic identifier, which matches the electronic identifier in the subsequent request, and the user identification information. Thereafter, server system 108 generates or obtains advertisements targeted to the user of client device 102 based at least in part on the identified set of characteristics for the user of client device 102. In some embodiments, server system 108 generates the advertisements based on the set of characteristics for the user of client device 102. In some embodiments, server system 108 causes the advertisement to be provided to client device 102 by sending the set of characteristics for the user of client device 102 to one of ad servers 124, which generates the advertisements based on the set of characteristics for the user of client device 102 and sends the advertisements to client device 102. In some embodiments, server system 108 performs operations 918 and 922 serially or in parallel.

After generating or obtaining the targeted advertisements, server system 108 provides (924) the targeted advertisements to client device 102.

Figure 9B:
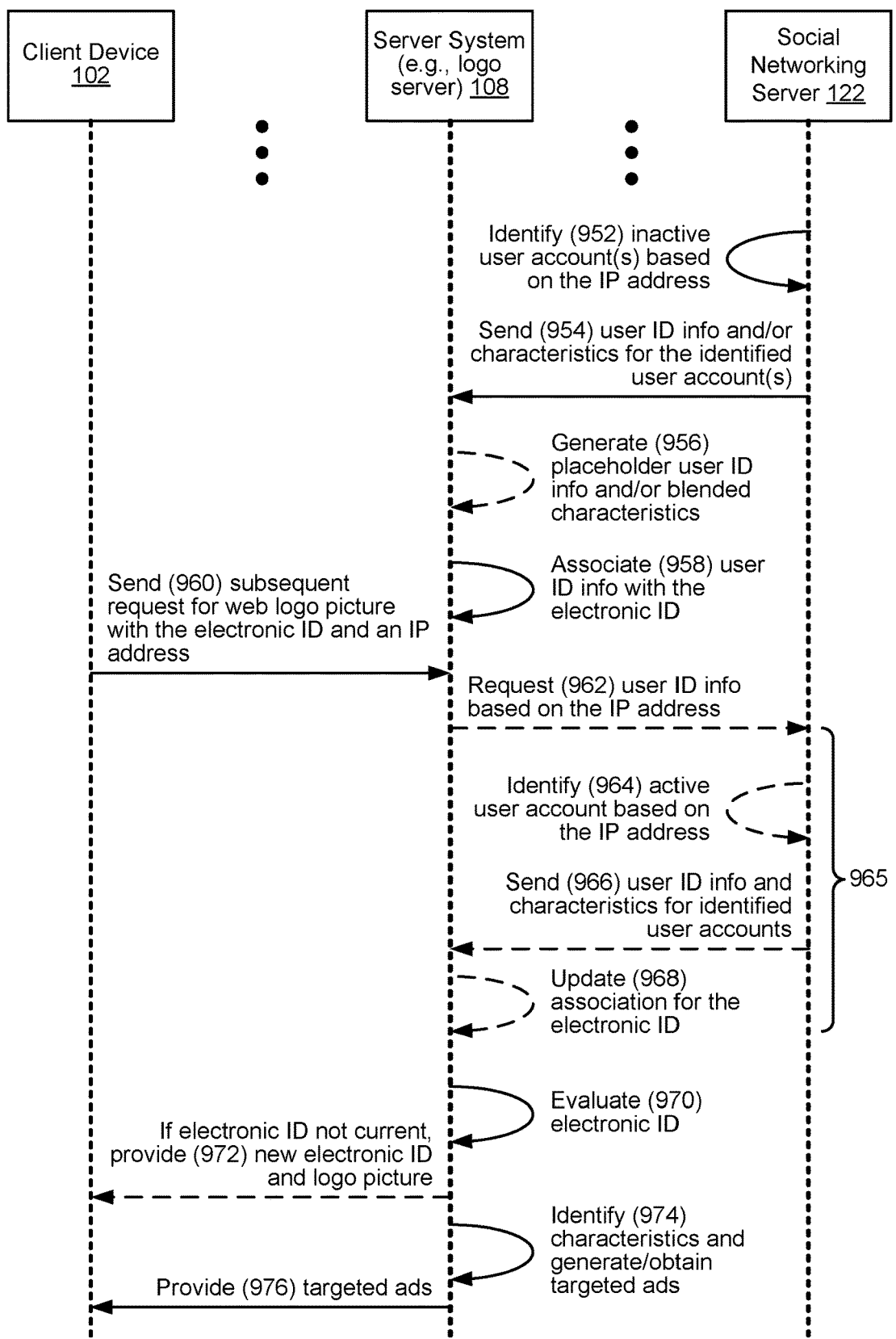
FIG. 9B illustrates a schematic flow diagram of a process for providing targeted advertisements in accordance with some embodiments.
Figure 10A:
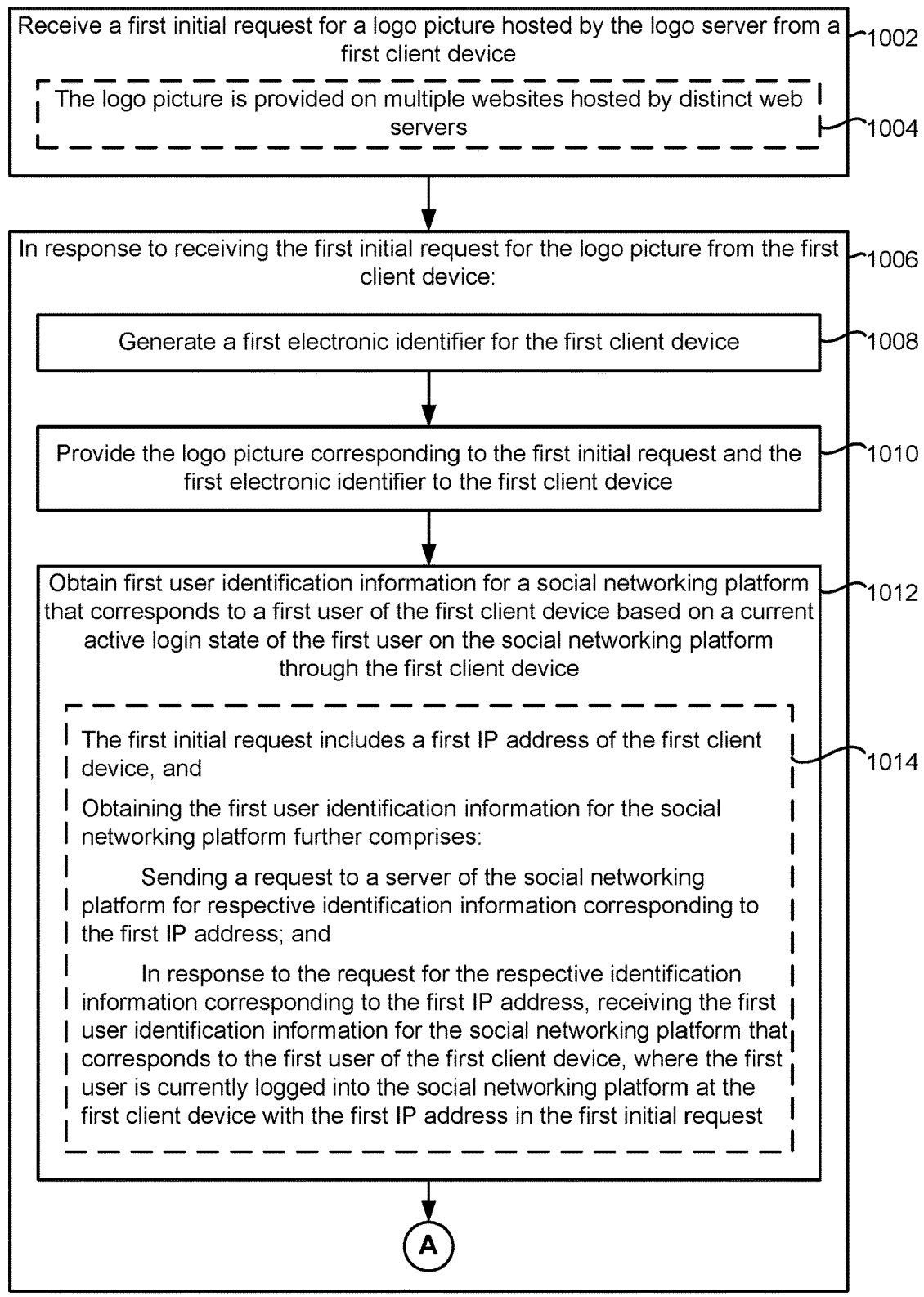
FIGS. 10A-10E illustrate a flowchart diagram of a method of providing targeted advertisements in accordance with some embodiments.
Figure 10B:
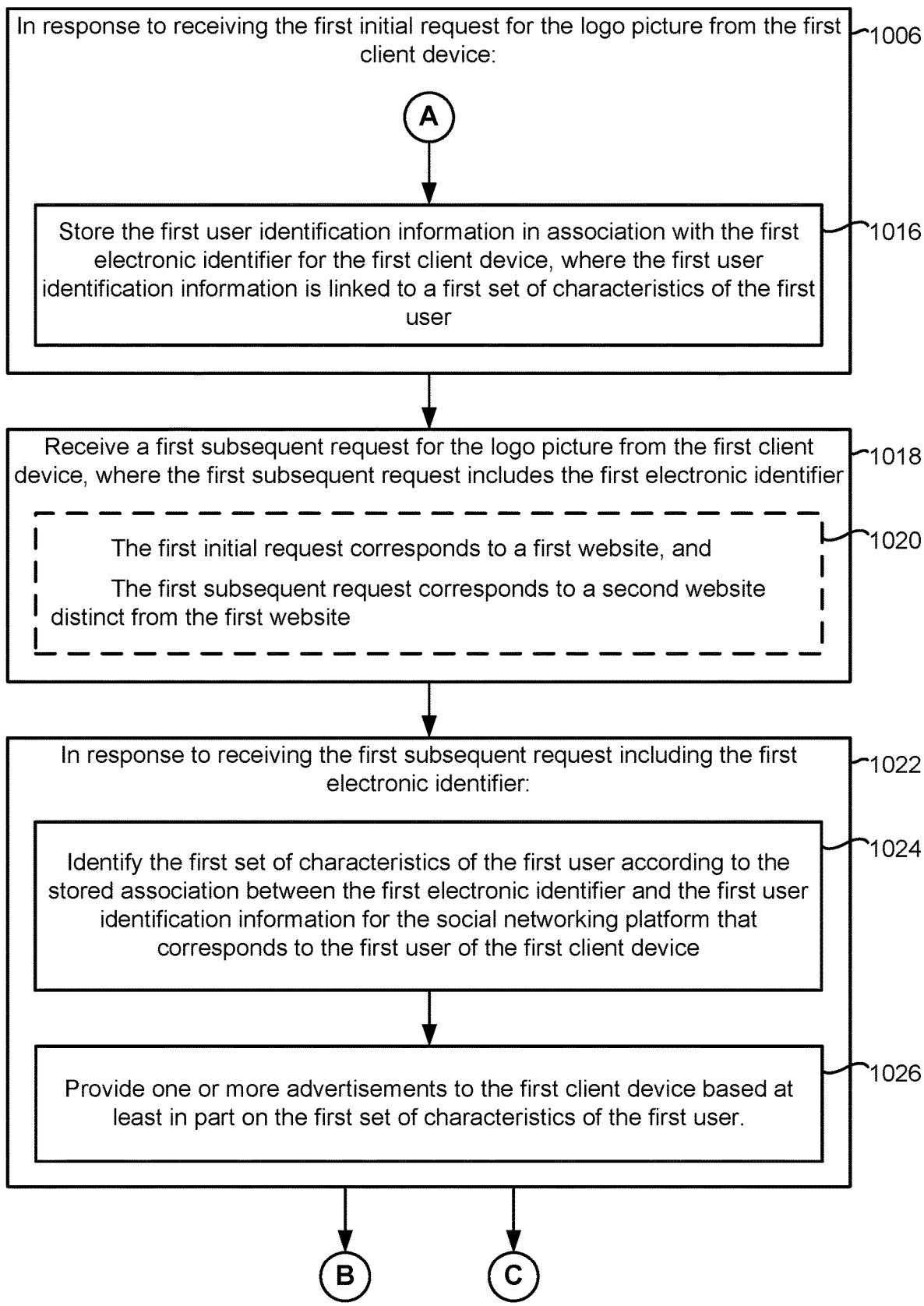
Figure 10C:
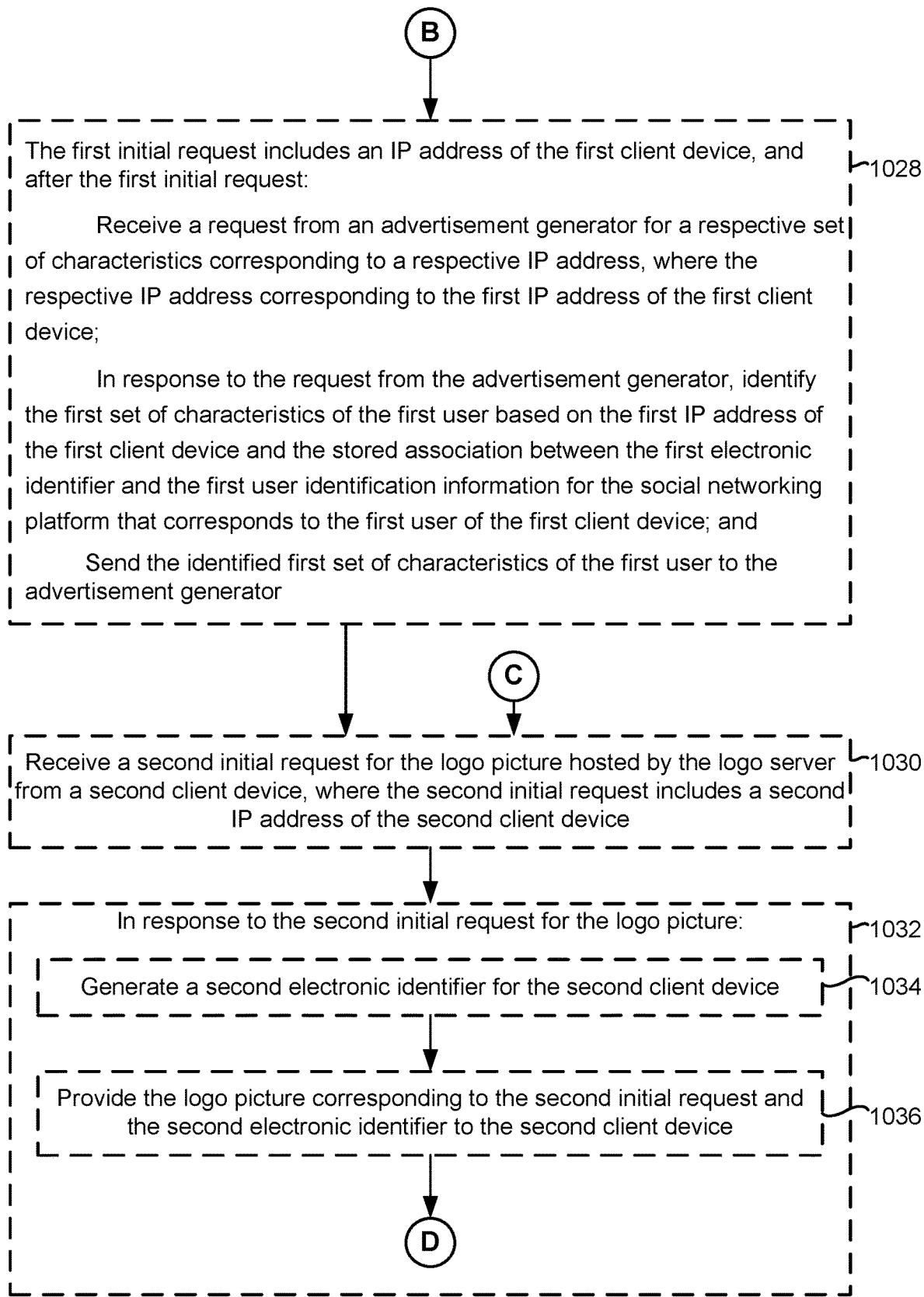
Figure 10D:
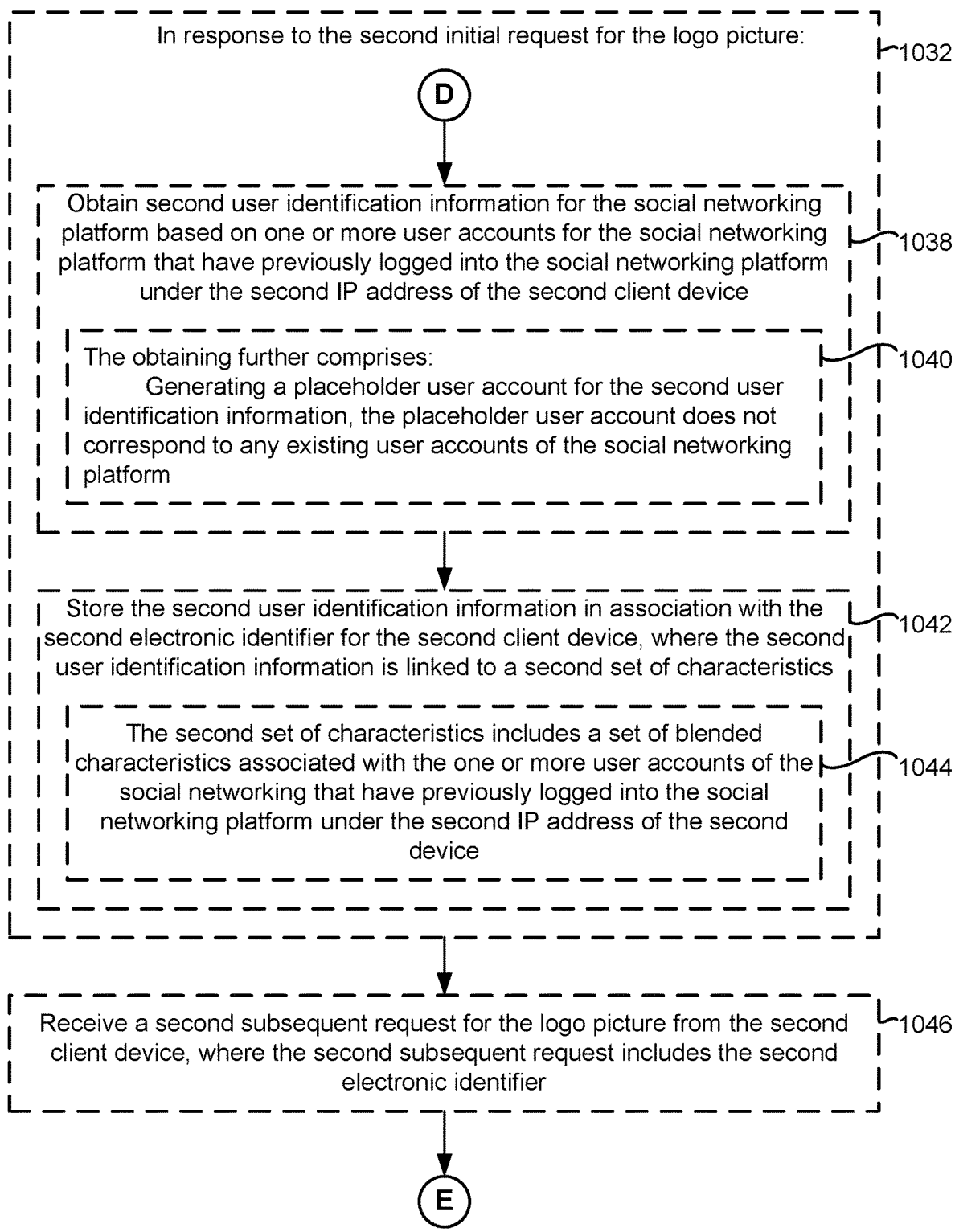
Figure 10E:
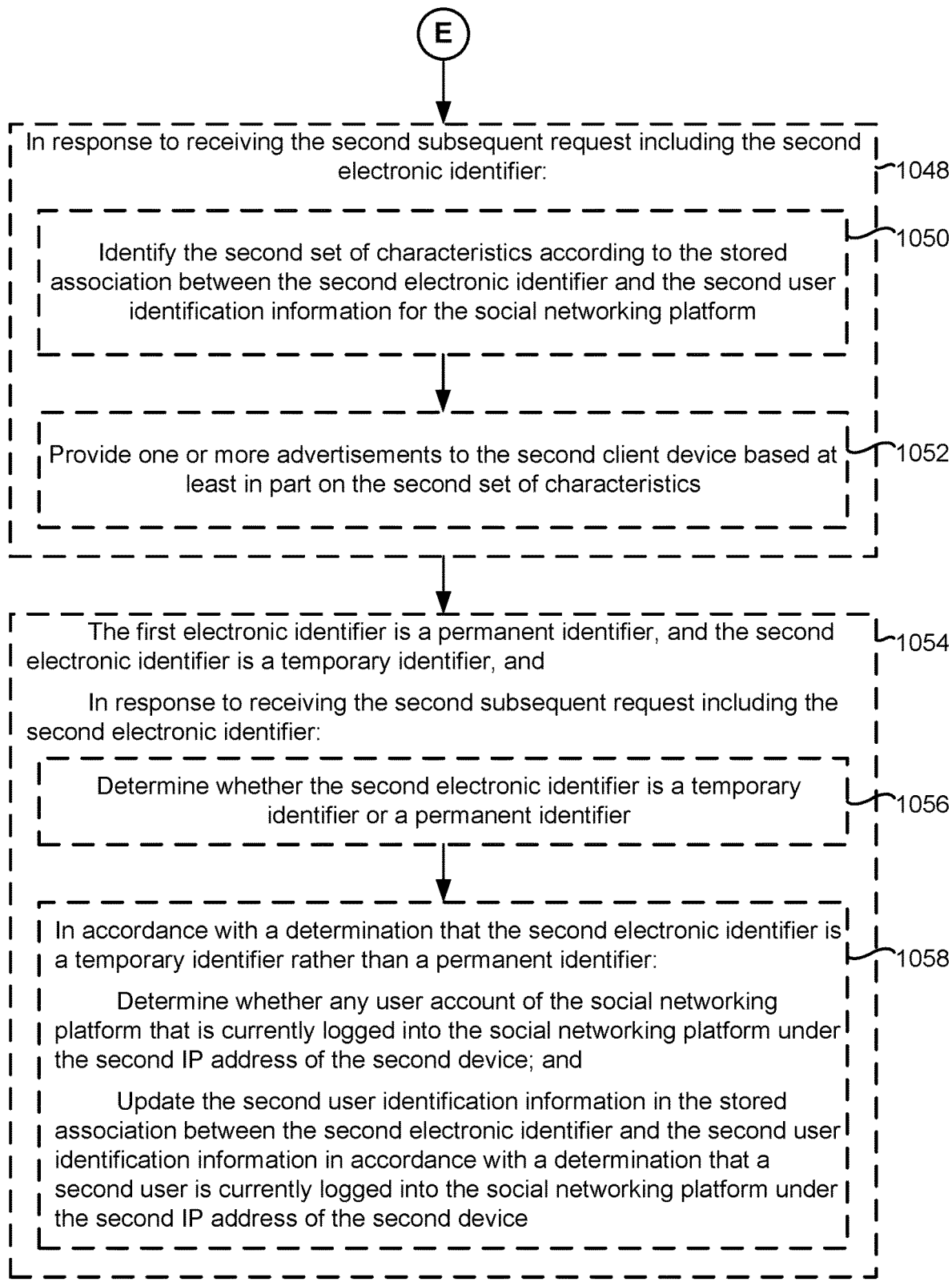

FIG. 9B illustrates a schematic flow diagram of a process 950 for providing targeted advertisements in accordance with some embodiments. In some embodiments, process 950 is performed in server-client environment 100 with a respective client device 102 (FIGS. 1 and 3), server system 108 (FIGS. 1-2), and social networking server 122 (FIGS. 1 and 4). In some embodiments, server system 108 (i.e., a logo server) hosts one or more resources included on a plurality of websites that may be accessed by any number of client devices 102 through web browser 104. The plurality of websites at least include a logo picture hosted by server system 108. In some embodiments, the plurality of websites that include the logo picture are all associated with or owned by a common entity such as the entity providing a social networking platform (e.g., the entity associated with social networking server 122). In some embodiments, social networking server 122 manages and operates a social networking platform which the user of respective client device 102 can access via social networking application 106 (FIGS. 1 and 3).

In some embodiments, process 950 starts with operations 902-908 of process 900 in FIG. 9A. For brevity, the discussion of those operations will not be repeated here.

In accordance with a determination that a user account is not currently logged into the social networking platform under the IP address included in the initial request to server system 108, social networking server 122 identifies (952) one or more user accounts that previously logged into the social networking platform under the IP address included in the initial request to server system 108.

Social networking server 122 sends (954) user identification information and/or set(s) of characteristics for the one or more identified user accounts that previously logged into the social networking platform under the IP address included in the initial request to server system 108.

In some embodiments, server system 108 optionally generates (956) a placeholder account for the user identification information obtained in operation 954. In some embodiments, server system 108 optionally generates a set of blended characteristics based on the set(s) of characteristics obtained in operation 954.

After receiving the user identification information and/or set(s) of characteristics for the one or more identified user accounts that previously logged into the social networking platform under the IP address included in the initial request to server system 108, server system 108 associates (958) the user identification information with the electronic identifier generated in operation 904 for client device 102. For example, server system 108 stores an entry in association database 116 (FIG. 5B) associating the electronic identifier with the user identification information and/or set(s) of characteristics for the one or more identified user accounts.

At a time subsequent to operation 958, client device 102 sends (960) a subsequent request for the logo picture to server system 108 with the electronic identifier and an IP address.

In some embodiments, in response to server system 108 receiving the subsequent request, server system 108 and social networking server 122 perform an optional set of operations 965 (i.e., operations 962-968) prior to, or in parallel with, operation 970. In other embodiments, in response to receiving the subsequent request, server system 108 performs operation 970.

In some embodiments, in response to receiving the subsequent request, server system 108 requests (962) user identification information from social networking server 122 based on the IP address included in the subsequent request to server system 108.

In some embodiments, in response to the request from server system 108, social networking server 122 identifies (964) an active user accounts on the social networking platform based on the IP address included in the subsequent request to server system 108.

In some embodiments, social networking server 122 sends (966) user identification information and a set of linked characteristics for the identified active user account.

In some embodiments, after receiving the user identification information and the set of linked characteristics, server system 108 updates (968) the association for the electronic identifier whereby the newly received user identification information is associated with the electronic identifier generated in operation 904 for client device 102. For example, server system 108 updates the entry stores in association database so that the electronic identifier generated in operation 904 is associated with the user identification information and the set of linked characteristics sent by server system 108 in operation 966.

After receiving the subsequent request, server system 108 evaluates (970) the electronic identifier included in the subsequent request.

In accordance with a determination that the electronic identifier included in the subsequent request is not current, server system 108 generates a new electronic identifier for client device 102 and sends (972) the new electronic identifier and the logo picture to client device 102.

After receiving the subsequent request, server system 108 identifies (974) the set of characteristics for the user of client device 102 based on the association between the electronic identifier, which matches the electronic identifier in the subsequent request, and the user identification information formed in operation 958 or 968. Server system 108 generates or obtains advertisements targeted to the user of client device 102 based at least in part on the identified set of characteristics linked to the user identification information. In some embodiments, server system 108 generates the advertisements based on the set of characteristics for the user of client device 102. In some embodiments, server system 108 causes the advertisement to be provided to client device 102 by sending the set of characteristics for the user of client device 102 to one of ad servers 124, which generates the advertisements based on the set of characteristics for the user of client device 102 and sends the advertisements to client device 102. In some embodiments, server system 108 performs operations 970 and 974 serially or in parallel.

After generating or obtaining the targeted advertisements, server system 108 provides (976) the targeted advertisements to client device 102.

FIGS. 10A-10E illustrate a flowchart diagram of a method 1000 of providing targeted advertisements in accordance with some embodiments. In some embodiments, method 1000 is performed by a server with one or more processors and memory. In some embodiments, the server is a logo server that hosts a logo picture that is included on a plurality of websites. For example, in some embodiments, method 1000 is performed by server system 108 (FIGS. 1-2) or a component thereof (e.g., resource hosting module 214, FIGS. 1-2). In some embodiments, method 1000 is governed by instructions that are stored in a non-transitory computer readable storage medium and the instructions are executed by one or more processors of the server. Optional operations are indicated by dashed lines (e.g., boxes with dashed-line borders).

The logo server receives (1002) a first initial request for a logo picture hosted by the logo server from a first client device. In some embodiments, server system 108 (i.e., the logo server) or a component thereof (e.g., request handling module 216, FIG. 2) receives a first initial request from a first client device 102 for a logo picture hosted by server system 108 (e.g., an HTTP get request associated with a URL for the logo picture), where the first initial request includes a first IP address associated with the first client device 102. For example, see operation 902 of process 900 in FIG. 9A.

For example, the logo picture is a web page resource with a URL embedded in a web page. For example, the logo picture is included on a plurality of independent distinct websites. The plurality of independent distinct websites are associated with the entity providing the social networking platform. For example, the first initial request corresponds to logo picture 616 on first website 610 in FIG. 6A.

In some embodiments, the logo picture is provided (1004) on multiple websites hosted by distinct web servers. For example, logo picture 616 is included on first website 610 (e.g., website A, which provides a news aggregation service) in FIG. 6A and on second website 632 (e.g., website B, which provides a media content ranking service) in FIG. 6B. For example, with reference FIGS. 6A-6B, first website 610 and second website 632 are hosted by distinct web servers.

In response to receiving the first initial request for the logo picture from the first client device (1006), the logo server generates (1008) a first electronic identifier for the first client device. In some embodiments, server system 108 (i.e., the logo server) or a component thereof (e.g., electronic identifier generating module 218, FIG. 2) generates a first electronic identifier (e.g., an e-tag) for the first client device 102 in response to the first initial request. For example, see operation 904 of process 900 in FIG. 9A.

For example, the electronic identifier is an e-tag. In some embodiments, the e-tag is a tag generated from the logo picture, so if the logo picture changes, the e-tag can be used to determine whether the logo picture has changed. For example, the electronic identifier is a tag (e.g., a hash or checksum) of the logo picture that also tracks the first client device. For example, with reference to operations 918-920 of process 900 in FIG. 9A, server system 108 evaluates whether the electronic identifier in the subsequent request is current (i.e., indicating whether the logo picture has changed), and server system 108 provides a new electronic identifier and the changed logo picture when the electronic identifier is not current.

The logo server provides (1010) the logo picture corresponding to the first initial request and the first electronic identifier to the first client device. In some embodiments, server system 108 (i.e., the logo server) or a component thereof (e.g., first providing module 220, FIG. 2) provides the logo picture and the first electronic identifier generated in operation 1008 to the first client device 102. For example, see operation 906 of process 900 in FIG. 9A. For example, after receiving the logo picture and the first electronic identifier, web browser module 104 of first client device 102 caches the logo picture and the first electronic identifier.

The logo server obtains (1012) first user identification information for a social networking platform that corresponds to a first user of the first client device based on a current active login state of the first user on the social networking platform through the first client device. In some embodiments, the user identification information includes a user account or user handle for the social networking platform. For example, the first initial request includes an IP address corresponding to the first client device 102. In some embodiments, server system 108 (i.e., the logo server) or a component thereof (e.g., obtaining module 222, FIG. 2) requests user identification information associated with the IP address from a server that hosts a social networking platform (e.g., social networking server 122, FIGS. 1 and 4). For example, see operation 908 of process 900 in FIG. 9A. In response to the request, social networking server 122 or a component thereof (e.g., identifying module 430, FIG. 4) identifies a user account that is currently logged into the social networking platform with that IP address. For example, identifying module 430 searches the current active user accounts list 442 (FIG. 5A) to identify an active user account logged into the social networking platform under the IP address. For example, see operation 910 of process 900 in FIG. 9A. After identifying an active user account, social networking server 122 obtains user identification information associated with the user account and also a set of characteristics linked to the user identification information. Subsequently, social networking server 122 or a component thereof (e.g., sending module 432, FIG. 4) sends the user identification information associated with the user account that is currently logged onto the social networking platform and the set of characteristics linked to the user identification information to server system 108. For example, see operation 912 of process 900 in FIG. 9A.

In some embodiments, the first initial request includes (1014) a first IP address of the first client device, and the logo server obtains the first user identification information for the social networking platform by: sending a request to a server of the social networking platform for respective identification information corresponding to the first IP address; and, in response to the request for the respective identification information corresponding to the first IP address, receiving the first user identification information for the social networking platform that corresponds to the first user of the first client device, where the first user is currently logged into the social networking platform at the first client device with the first IP address in the first initial request. In some embodiments, the social networking platform (e.g., a chat program) is hosted by a server distinct from the logo server or by the logo server. For example, with reference to operation 908 of process 900 in FIG. 9A, server system 108 requests user identification information from social networking server 122 based on the IP address that was included in the initial request.

The logo server stores (1016) the first user identification information in association with the first electronic identifier for the first client device, where the first user identification information is linked to a first set of characteristics of the first user. In some embodiments, server system 108 (i.e., the logo server) or a component thereof (e.g., associating module 228, FIG. 2) creates an entry in association database 116 (FIG. 5B) that associates the first electronic identifier (e.g., an e-tag) with the first user identification information for the social networking platform, which in turn is linked to the first set of characteristics of the first user. For example, see operation 914 of process 900 in FIG. 9A.

The logo server receives (1018) a first subsequent request for the logo picture from the first client device, where the first subsequent request includes the first electronic identifier. In some embodiments, server system 108 (i.e., the logo server) or a component thereof (e.g., request handling module 216, FIG. 2) receives a first subsequent request from the first client device 102 for the logo picture hosted by server system 108 (e.g., another HTTP get request associated with a URL for the logo picture), where the first subsequent request includes an IP address associated with the first client device 102 and the first electronic identifier, which was cached by web browser 104 executed on the first client device 102. For example, see operation 916 of process 900 in FIG. 9A. In some embodiments, the first subsequent request is associated with a website distinct from the website associated with the first initial request that also includes the logo picture. For example, the first subsequent request corresponds to logo picture 616 on second website 632 in FIG. 6B.

In some embodiments, the first initial request corresponds (1020) to a first website, and the first subsequent request corresponds to a second website distinct from the first website. For example, the first initial request corresponds to logo picture 616 on first website 610 (e.g., website A, which provides a news aggregation service) in FIG. 6A, and the first subsequent request corresponds to logo picture 616 on second website 632 (e.g., website B, which provides a media content ranking service) in FIG. 6B.

In response to receiving the first subsequent request including the first electronic identifier (1022), the logo server: identifies (1024) the first set of characteristics of the first user according to the stored association between the first electronic identifier and the first user identification information for the social networking platform that corresponds to the first user of the first client device; and provides (1026) one or more advertisements to the first client device based at least in part on the first set of characteristics of the first user. In some embodiments, server system 108 (i.e., the logo server) or a component thereof (e.g., identifying module 232, FIG. 2) identifies an entry in association database 116 (FIG. 5B) that includes the first electronic identifier in the first subsequent request, which was created in operation 1016. The identified entry includes the first set of characteristics of the first user. In some embodiments, server system 108 or a component thereof (e.g., ad generating module 234, FIG. 2) generates one or more advertisements based at least in part on the identified first set of characteristics of the first user, and server system 108 or a component thereof (e.g., second providing module 236, FIG. 2) provides the one or more generated advertisements to the first client device 102. For example, see operations 922-924 of process 900 in FIG. 9A. In some embodiments, server system 108 causes the advertisements too be provided to the first client device 102 by sending the first set of characteristics for the user of the first client device 102 to one of ad servers 124, which generates the advertisements based on the first set of characteristics for the user of the first client device 102 and sends the advertisements to the first client device 102.

In some embodiments, the first initial request includes (1028) an IP address of the first client device, and the logo server: receives a request from an advertisement generator for a respective set of characteristics corresponding to a respective IP address, where the respective IP address corresponding to the first IP address of the first client device; in response to the request from the advertisement generator, identifies the first set of characteristics of the first user based on the first IP address of the first client device and the stored association between the first electronic identifier and the first user identification information for the social networking platform that corresponds to the first user of the first client device; and sends the identified first set of characteristics of the first user to the advertisement generator. For example, the advertisement (ad) generator is a component of server system 108 (i.e., the logo server) that receives requests for serving ads associated with particular URLs. In another example, the ad generator is one of ad servers 124-A, . . . , 124-N, which is separate from server system 108 (i.e., the logo server). In some embodiments, ad generator receives a request for an ad (e.g., another resource associated with a URL that directs to the ad generator) from the respective IP address (i.e., the first IP address) and requests a set of characteristics from server system 108 (i.e., the logo server) corresponding to the respective IP address so as to server targeted ads.

In some embodiments, server system 108 (i.e., the logo server) or a component thereof (e.g., request handling module 216, FIG. 2) receives the request from the advertisement (ad) generator for a respective set of characteristics corresponding to a respective IP address. In response to the request, server system 108 or a component thereof (e.g., identifying module 232, FIG. 2) identifies an entry in association database 116 (FIG. 5B) that includes the respective IP address. In some embodiments, server system 108 or a component thereof sends the identified respective set of characteristics to the ad generator. In turn, the ad generator generates advertisements targeted to the user corresponding to the respective IP address based on the respective set of characteristics received from server system 108.

In some embodiments, the logo server receives (1030) a second initial request for the logo picture hosted by the logo server from a second client device, where the second initial request includes a second IP address of the second client device. In some embodiments, server system 108 (i.e., the logo server) or a component thereof (e.g., request handling module 216, FIG. 2) receives a second initial request from a second client device 102 for a logo picture hosted by server system 108 (e.g., an HTTP get request associated with a URL for the logo picture), where the second initial request includes a second IP address associated with the second client device 102. For example, the second initial request corresponds to logo picture 616 on first website 610 in FIG. 6A.

In some embodiments, in response to the second initial request for the logo picture (1032), the logo server generates (1034) a second electronic identifier for the second client device. In some embodiments, server system 108 (i.e., the logo server) or a component thereof (e.g., electronic identifier generating module 218, FIG. 2) generates a second electronic identifier (e.g., an e-tag) for the second client device 102 in response to receiving the second initial request.

In some embodiments, the logo server provides (1036) the logo picture corresponding to the second initial request and the second electronic identifier to the second client device. In some embodiments, server system 108 (i.e., the logo server) or a component thereof (e.g., first providing module 220, FIG. 2) provides the logo picture and the second electronic identifier generated in operation 1034 to second client device 102. For example, after receiving the logo picture and the second electronic identifier, web browser module 104 of second client device 102 caches the logo picture and the second electronic identifier.

In some embodiments, the logo server obtains (1038) second user identification information for the social networking platform based on one or more user accounts for the social networking platform that have previously logged into the social networking platform under the second IP address of the second client device. For example, a user account of the social networking platform is not currently logged into the social networking platform under the second IP address in the second initial request; however, one or more user accounts have previously logged into the social networking platform under the second IP address in the second initial request. In some embodiments, the server associated with the social networking platform (e.g., social networking server 122, FIGS. 1 and 4) takes a best guess as to the second user identification information based on the second IP address included in the second initial request. In some embodiments, the second electronic identifier is associated with multiple user accounts. In some embodiments, the second electronic identifier is associated with a placeholder user account that corresponds to a blended/average set of characteristics.

In some embodiments, server system 108 (i.e., the logo server) or a component thereof (e.g., obtaining module 222, FIG. 2) requests user identification information associated with the second IP address from a server that hosts a social networking platform (e.g., social networking server 122, FIGS. 1 and 4). In response to the request, social networking server 122 or a component thereof (e.g., identifying module 430, FIG. 4) determines that there is not a user account currently logged into the social networking platform under the second IP address and identifies one or more user accounts that previously logged into the social networking platform with that second IP address. For example, identifying module 430 searches the current active user accounts list 442 (FIG. 5A) to determine that there is not a user account currently logged into the social networking platform under the second IP address. For example, see operation 952 of process 950 in FIG. 9B. After identifying the one or more inactive user accounts, social networking server 122 obtains user identification information associated with the one or more inactive user accounts and also one or more sets of characteristics linked to the user identification information. Subsequently, social networking server 122 or a component thereof (e.g., sending module 432, FIG. 4) sends the user identification information associated with the one or more inactive user accounts and the one or more sets of characteristics linked to the user identification information to server system 108. For example, see operation 954 of process 950 in FIG. 9B.

In some embodiments, the logo server obtains (1040) the second user identification information by generating a placeholder user account for the second user identification information, where the placeholder user account does not correspond to any existing user accounts of the social networking platform. In some embodiments, when the chat server cannot identify a user account associated with the second IP address, server system 108 (i.e., the logo server) or a component thereof (e.g., placeholder generating module 224, FIG. 2) generates a placeholder user account for the entry to be stored in association database 116 (FIG. 5B), where the placeholder user account is associated with the second electronic identifier. For example, see operation 956 of process 950 in FIG. 9B.

In some embodiments, the logo server stores (1042) the second user identification information in association with the second electronic identifier for the second client device, where the second user identification information is linked to a second set of characteristics. In some embodiments, server system 108 (i.e., the logo server) or a component thereof (e.g., associating module 228, FIG. 2) creates an entry in association database 116 (FIG. 5B) that associates the second electronic identifier (e.g., an c-tag) with the second user identification information for the social networking platform, which in turn is linked to the second set of characteristics of the first user. For example, see operation 958 of process 950 in FIG. 9B.

In some embodiments, the second set of characteristics includes (1044) a set of blended characteristics associated with the one or more user accounts of the social networking that have previously logged into the social networking platform under the second IP address of the second device. For example, the second IP address traces to an Internet café where many users have logged into the social networking platform. Thus, the electronic identifier is associated with a plurality of user ID info. In some embodiments, server system 108 (i.e., the logo server) or a component thereof (e.g., blending module 226, FIG. 2) creates a blended profile associated with the most frequent, most similar characteristics, or the average of the characteristics between the users that have logged on the social networking platform under the second IP address. For example, see operation 956 of process 950 in FIG. 9B.

In some embodiments, the logo server receives (1046) a second subsequent request for the logo picture from the second client device, where the second subsequent request includes the second electronic identifier. In some embodiments, server system 108 (i.e., the logo server) or a component thereof (e.g., request handling module 216, FIG. 2) receives a second subsequent request from the second client device 102 for the logo picture hosted by server system 108 (e.g., another HTTP get request associated with a URL for the logo picture), where the second subsequent request includes an IP address associated with the second client device 102 and the second electronic identifier, which was cached by web browser 104 executed on the second client device 102. For example, see operation 960 of process 950 in FIG. 9B. In some embodiments, the second subsequent request is associated with a website distinct from the website associated with the first initial request that also includes the logo picture. For example, the first subsequent request corresponds to logo picture 616 on second website 632 in FIG. 6B.

In response to receiving the second subsequent request including the second electronic identifier (1048), the logo server: identifies (1050) the second set of characteristics according to the stored association between the second electronic identifier and the second user identification information for the social networking platform; and provides (1052) one or more advertisements to the second client device based at least in part on the second set of characteristics. In some embodiments, server system 108 (i.e., the logo server) or a component thereof (e.g., identifying module 232, FIG. 2) identifies an entry in association database 116 (FIG. 5B) that includes the second electronic identifier in the second subsequent request, which was created in operation 1042. The identified entry includes the second set of characteristics of the second user. In some embodiments, server system 108 or a component thereof (e.g., ad generating module 234, FIG. 2) generates one or more advertisements based at least in part on the identified second set of characteristics of the second user, and server system 108 or a component thereof (e.g., second providing module 236, FIG. 2) provides the one or more generated advertisements to the second client device 102. For example, see operations 974-976 of process 950 in FIG. 9B.

In some embodiments, the first electronic identifier is (1054) a permanent identifier, and the second electronic identifier is a temporary identifier.

In response to receiving the second subsequent request including the second electronic identifier, the logo server: determines (1056) whether the second electronic identifier is a temporary identifier or a permanent identifier.

In accordance with a determination that the second electronic identifier is a temporary identifier rather than a permanent identifier, the logo server (1058): determines whether any user account of the social networking platform that is currently logged into the social networking platform under the second IP address of the second device; and updates the second user identification information in the stored association between the second electronic identifier and the second user identification information in accordance with a determination that a second user is currently logged into the social networking platform under the second IP address of the second device. In some embodiments, after receiving the second subsequent request, server system 108 (i.e., the logo server) sends another request for second user identification information to social networking server 122 and discover the second user that is currently logged into the social networking platform using the second client device 102. For example, see operations 962-966 of process 950 in FIG. 9B. In response, server system 108 or a component thereof (e.g., updating module 238, FIG. 2) replaces the second user identification information in a respective entry of association database 116 (FIG. 5B) corresponding to the second electronic identifier, which was created in operation 1042, with the actual active user ID of the second user and/or updates the blended set of characteristics in the respective entry corresponding to the second electronic identifier by adding the set of characteristics corresponding to the second user or by biasing the blended set of characteristics more toward the second user. In some embodiments, if server system 108 replaces the second user identification information (e.g., the placeholder user account created in operation 1040) with the user identification information of the second user, server system 108 could also upgrade the second electronic identifier from a temporary identifier to a permanent identifier.

It should be understood that the particular order in which the operations in FIGS. 10A-10E have been described is merely exemplary and is not intended to indicate that the described order is the only order in which the operations could be performed. One of ordinary skill in the art would recognize various ways to reorder the operations described herein. Additionally, it should be noted that details of other processes described herein with respect to other methods described herein (e.g., methods 700 and 800) are also applicable in an analogous manner to method 1000 described above with respect to FIGS. 10A-10E.

Figure 11:
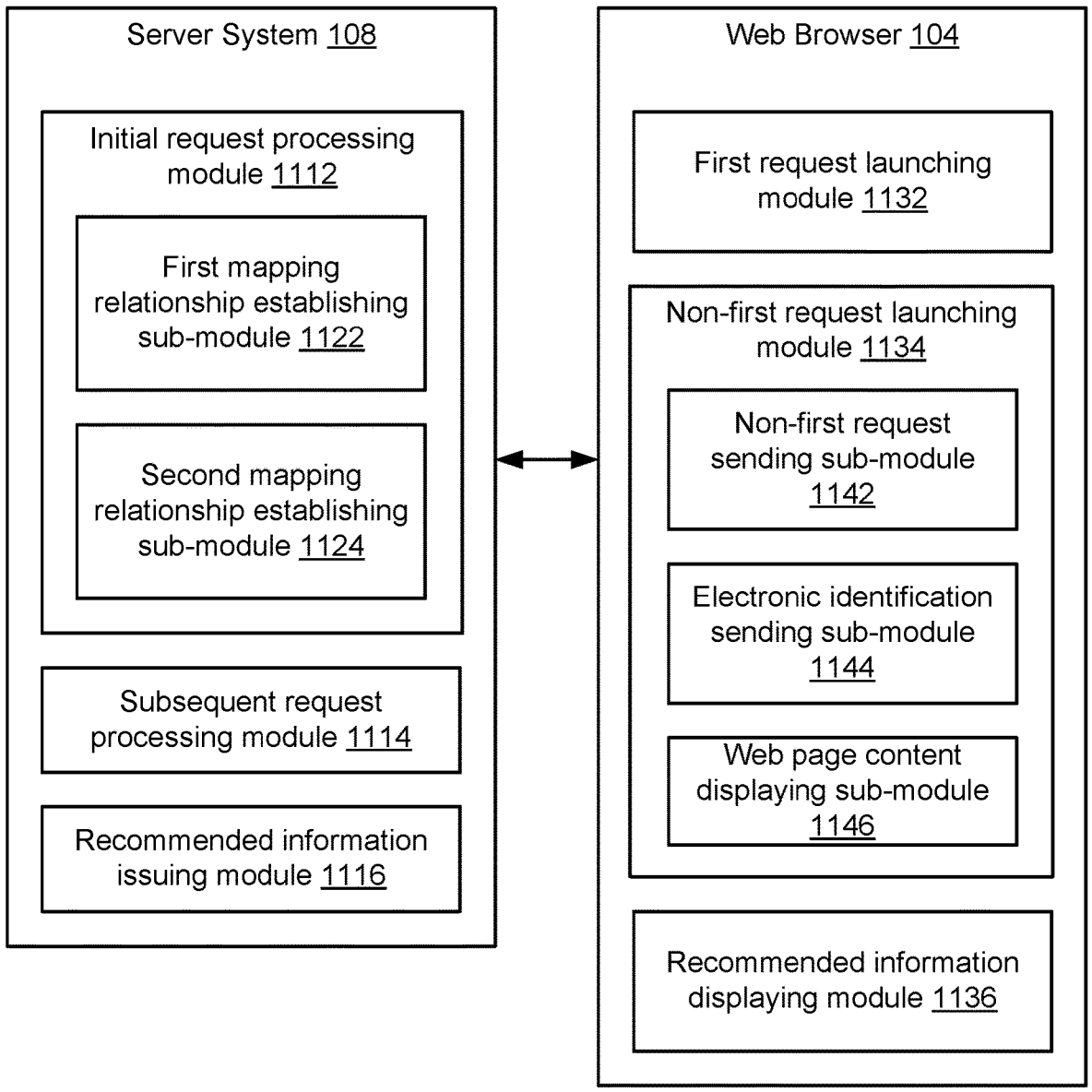
FIG. 11 is a block diagram of a system for issuing recommended information in accordance with some embodiments.

FIG. 11 is a block diagram of a system for issuing recommended information in accordance with some embodiments. In some embodiments, the system includes server system 108 (i.e., a logo server) and a web browser 104 executed on a client device 102.

In some embodiments, server system 108 includes an initial request processing module 1112, a subsequent request processing module, and a recommended information issuing module 1116.

In some embodiments, initial request processing module 1112 is configured to receive an initial acquisition request for web page content from web browser 104, issue the web page content containing the logo picture to web browser 104, generate an electronic identification for the requestor (i.e., client device 102), and issue the electronic identification to web browser 104. Moreover, in some embodiments, initial request processing module 1112 is configured to establish and store a mapping relationship between the electronic identification and the requestor identification.

In some embodiments, initial request processing module 1112 includes a first mapping relationship establishing sub-module 1122 configured to acquire the requestor identification of when the requestor is currently logged into a social networking platform, and establish the mapping relationship between the electronic identification and the requestor identification when determining that the requestor adopts the requestor identification to log in currently.

In some embodiments, initial request processing module 1112 includes a second mapping relationship establishing sub-module 1124 configured to acquire the current IP address of the requestor after determining that the requestor is not currently logged into a social networking platform, determine the requestor identification corresponding to the current IP address, and establish the mapping relationship between the electronic identification and the requestor identification. In some embodiments, the second mapping relationship establishing sub-module determines out the requestor identification corresponding to the current IP address according to the counted correspondence relationship between the IP address and the requestor identification (e.g., an IP address frequently used by the user account corresponding to the requestor identification). In the correspondence relationship, the requestor identification corresponds to at least one IP address.

In some embodiments, non-first request processing module 1114 is configured to receive a subsequent request for web page content from web browser 104 including the electronic identification extracted from the browser cache, issue the requested web page content to web browser 104, where the issued web page content does not contain the logo picture, acquire the requestor identification corresponding to the electronic identification according to the mapping relationship, acquire characteristic information of the requestor based on the requestor identification, and send the characteristic information to the recommended information issuing module.

In some embodiments, recommended information issuing module 1116 is configured to generate recommended information associated with the characteristic information and issue the recommended information to web browser 104. In some embodiments, recommended information issuing module 1116 is implemented by a single server which (i.e., a push server), where the push server generates the recommended information associated with the characteristic information and issues the recommended information to the current IP address of the requestor.

In some embodiments, web browser 104 includes an initial request launching module 1132, a subsequent request launching module 1134, and a recommended information displaying module 1136.

In some embodiments, initial request launching module 1132 is configured to send an initial request for web page content to server system 108, receive the web page content containing the logo picture and the electronic identification issued by server system 108, and store the electronic identification in the browser cache corresponding to the logo picture.

In some embodiments, subsequent request launching module 1134 is configured to send a subsequent request for web page content to server system 108 including the electronic identification from the browser cache, receive the web page content not containing the logo picture and issued by server system 108, extract the logo picture corresponding to the electronic identification from the browser cache, and display the logo picture in the received web page content.

In some embodiments, subsequent request launching module 1134 includes a subsequent request sending sub-module 1142, an electronic identification sending sub-module 1144, and a web page content displaying sub-module 1146.

In some embodiments, subsequent request sending sub-module 1142 is configured to send the subsequent acquisition request for web page content to server system 108

In some embodiments, electronic identification sending sub-module 1144 is configured to receive the electronic identification extracting request sent by server system 108, extract the electronic identification from the browser cache, and send the electronic identification to server system 108.

In some embodiments, web page content displaying sub-module 1146 is configured to receive the web page content not containing the logo picture issued by server system 108, extract the logo picture corresponding to the electronic identification from the browser cache, and display the logo picture in the received web page content.

In some embodiments, recommended information displaying module 1136 is configured to receive and display the recommended information issued by server system 108.

While particular embodiments are described above, it will be understood it is not intended to limit the application to these particular embodiments. On the contrary, the application includes alternatives, modifications and equivalents that are within the spirit and scope of the appended claims. Numerous specific details are set forth in order to provide a thorough understanding of the subject matter presented herein. But it will be apparent to one of ordinary skill in the art that the subject matter may be practiced without these specific details. In other instances, well-known methods, procedures, components, and circuits have not been described in detail so as not to unnecessarily obscure aspects of the embodiments.

What is claimed is:

1. A method of providing targeted advertisements, comprising:
   at a logo server for providing a logo picture displayed on a plurality of websites that are operated by a service provider, the logo server having one or more processors and memory:
      receiving, in response to a first request by a first user to access a first website operated by the service provider on a first client device, a first initial request for retrieving the logo picture hosted by the logo server to be displayed on the first website on the first client device;
      in response to receiving the first initial request for the logo picture from the first client device:
         generating a first electronic identifier for the first user of the first client device;
         mapping the first electronic identifier of the first user with the logo picture and a first device identifier of the first client device;
         providing the logo picture corresponding to the first initial request and the first electronic identifier of the first user to the first client device;
         obtaining first user identification information for a social networking platform operated by the service provider, the first user identification information corresponding to the first user of the first client device based on a current active login state of the first user on the social networking platform through the first client device; and
         storing the first user identification information in association with the first electronic identifier of the first user mapped with the logo picture and the first device identifier of the first client device, wherein the first user identification information is linked to a first set of characteristics of the first user;
      receiving, in response to a second request by the first user to access a second website operated by the service provider on the first client device, a first subsequent request for retrieving the logo picture to be displayed on the second website on the first client device; and
      in response to receiving the first subsequent request:
         sending a request for the first electronic identifier of the first user to the first client device;
         receiving the first electronic identifier of the first user from the first client device, wherein the first client device retrieves the first electronic identifier of the first user and the logo picture from its cache and returns the first electronic identifier of the first user to the logo server and displays the logo picture on the second website operated by the service provider;
         identifying the first set of characteristics of the first user according to the stored association between the received first electronic identifier of the first user mapped with the logo picture and the first device identifier of the first client device and the first user identification information for the social networking platform that corresponds to the first user of the first client device; and
         providing one or more advertisements to the first client device based at least in part on the first set of characteristics of the first user for display on the second website operated by the service provider.

2. The method of claim 1, wherein the logo picture is provided on multiple websites hosted by distinct web servers.

3. The method of claim 1, wherein the first initial request corresponds to the first website, and
   wherein the first subsequent request corresponds to the second website distinct from the first website.

4. The method of claim 1, wherein the first initial request includes a first IP address of the first client device, and
   wherein obtaining the first user identification information for the social networking platform further comprises:
      sending a request to a server of the social networking platform for respective identification information corresponding to the first IP address; and
      in response to the request for the respective identification information corresponding to the first IP address, receiving the first user identification information for the social networking platform that corresponds to the first user of the first client device, wherein the first user is currently logged into the social networking platform at the first client device with the first IP address in the first initial request.

5. The method of claim 1, wherein the first initial request includes an IP address of the first client device, and the method further comprises:
   receiving a request from an advertisement generator for a respective set of characteristics corresponding to a respective IP address, wherein the respective IP address corresponding to the first IP address of the first client device;
   in response to the request from the advertisement generator, identifying the first set of characteristics of the first user based on the first IP address of the first client device and the stored association between the first electronic identifier and the first user identification information for the social networking platform that corresponds to the first user of the first client device; and
   sending the identified first set of characteristics of the first user to the advertisement generator.

6. The method of claim 1, further comprising:
   receiving a second initial request for the logo picture hosted by the logo server from a second client device, wherein the second initial request includes a second IP address of the second client device;
   in response to the second initial request for the logo picture:
      generating a second electronic identifier mapped with the logo picture and a second device identifier of the second client device;
      providing the logo picture corresponding to the second initial request and the second electronic identifier to the second client device;
      obtaining second user identification information for the social networking platform based on one or more user accounts for the social networking platform that have previously logged into the social networking platform under the second IP address of the second client device;

storing the second user identification information in association with the second electronic identifier, wherein the second user identification information is linked to a second set of characteristics;

receiving a second subsequent request for the logo picture from the second client device, wherein the second subsequent request includes the second electronic identifier; and in response to receiving the second subsequent request including the second electronic identifier:

identifying the second set of characteristics according to the stored association between the second electronic identifier and the second user identification information for the social networking platform; and providing one or more advertisements to the second client device based at least in part on the second set of characteristics.

7. The method of claim 6, wherein the second set of characteristics includes a set of blended characteristics associated with the one or more user accounts of the social networking that have previously logged into the social networking platform under the second IP address of the second device.

8. The method of claim 6, wherein obtaining the second user identification information further comprises:

generating a placeholder user account for the second user identification information, the placeholder user account does not correspond to any existing user accounts of the social networking platform.

9. The method of claim 6, wherein the first electronic identifier is a permanent identifier, and the second electronic identifier is a temporary identifier, and the method further comprises:

in response to receiving the second subsequent request including the second electronic identifier:

determining whether the second electronic identifier is a temporary identifier or a permanent identifier; and in accordance with a determination that the second electronic identifier is a temporary identifier rather than a permanent identifier:

determining whether any user account of the social networking platform that is currently logged into the social networking platform under the second IP address of the second device; and updating the second user identification information in the stored association between the second electronic identifier and the second user identification information in accordance with a determination that a second user is currently logged into the social networking platform under the second IP address of the second device.

10. A logo server, comprising:
one or more processors; and
memory storing one or more programs to be executed by the one or more processors, the one or more programs comprising instructions for:

receiving, in response to a first request by a first user to access a first website operated by the service provider on a first client device, a first initial request for retrieving the logo picture hosted by the logo server to be displayed on the first website on the first client device;

in response to receiving the first initial request for the logo picture from the first client device:

generating a first electronic identifier for the first user of the first client device;

mapping the first electronic identifier of the first user with the logo picture and a first device identifier of the first client device;

providing the logo picture corresponding to the first initial request and the first electronic identifier of the first user to the first client device;

obtaining first user identification information for a social networking platform operated by the service provider, the first user identification information corresponding to the first user of the first client device based on a current active login state of the first user on the social networking platform through the first client device; and storing the first user identification information in association with the first electronic identifier of the first user mapped with the logo picture and the first device identifier of the first client device, wherein the first user identification information is linked to a first set of characteristics of the first user;

receiving, in response to a second request by the first user to access a second website operated by the service provider on the first client device, a first subsequent request for retrieving the logo picture to be displayed on the second website on the first client device; and in response to receiving the first subsequent request:

sending a request for the first electronic identifier of the first user to the first client device;

receiving the first electronic identifier of the first user from the first client device, wherein the first client device retrieves the first electronic identifier of the first user and the logo picture from its cache and returns the first electronic identifier of the first user to the logo server and displays the logo picture on the second website operated by the service provider;

identifying the first set of characteristics of the first user according to the stored association between the received first electronic identifier of the first user mapped with the logo picture and the first device identifier of the first client device and the first user identification information for the social networking platform that corresponds to the first user of the first client device; and providing one or more advertisements to the first client device based at least in part on the first set of characteristics of the first user for display on the second website operated by the service provider.

11. The logo server of claim 10, wherein the logo picture is provided on multiple websites hosted by distinct web servers.

12. The logo server of claim 10, wherein the first initial request corresponds to the first website, and
wherein the first subsequent request corresponds to the second website distinct from the first website.

13. The logo server of claim 10, wherein the first initial request includes a first IP address of the first client device, and
wherein obtaining the first user identification information for the social networking platform further comprises:

sending a request to a server of the social networking platform for respective identification information corresponding to the first IP address; and in response to the request for the respective identification information corresponding to the first IP address, receiving the first user identification information for the social networking platform that corresponds to the first user of the first client device, wherein the first user is currently logged into the social networking platform at the first client device with the first IP address in the first initial request.

14. The logo server of claim 10, wherein the one or more programs further comprise instructions for:
receiving a second initial request for the logo picture hosted by the logo server from a second client device, wherein the second initial request includes a second IP address of the second client device;
in response to the second initial request for the logo picture:
generating a second electronic identifier mapped with the logo picture and a second device identifier of the second client device;
providing the logo picture corresponding to the second initial request and the second electronic identifier to the second client device;
obtaining second user identification information for the social networking platform based on one or more user accounts for the social networking platform that have previously logged into the social networking platform under the second IP address of the second client device;
storing the second user identification information in association with the second electronic identifier, wherein the second user identification information is linked to a second set of characteristics;
receiving a second subsequent request for the logo picture from the second client device, wherein the second subsequent request includes the second electronic identifier; and
in response to receiving the second subsequent request including the second electronic identifier:
identifying the second set of characteristics according to the stored association between the second electronic identifier and the second user identification information for the social networking platform; and
providing one or more advertisements to the second client device based at least in part on the second set of characteristics.

15. The logo server of claim 14, wherein the first electronic identifier is a permanent identifier, and the second electronic identifier is a temporary identifier, and wherein the one or more programs further comprise instructions for:
in response to receiving the second subsequent request including the second electronic identifier:
determining whether the second electronic identifier is a temporary identifier or a permanent identifier; and
in accordance with a determination that the second electronic identifier is a temporary identifier rather than a permanent identifier:
determining whether any user account of the social networking platform that is currently logged into the social networking platform under the second IP address of the second device; and
updating the second user identification information in the stored association between the second electronic identifier and the second user identification information in accordance with a determination that a second user is currently logged into the social networking platform under the second IP address of the second device.

16. A non-transitory computer readable storage medium storing one or more programs, the one or more programs comprising instructions, which, when executed by a logo server with one or more processors, cause the logo server to perform operations comprising:
receiving, in response to a first request by a first user to access a first website operated by the service provider on a first client device, a first initial request for retrieving the logo picture hosted by the logo server to be displayed on the first website on the first client device;
in response to receiving the first initial request for the logo picture from the first client device:
generating a first electronic identifier for the first user of the first client device;
mapping the first electronic identifier of the first user with the logo picture and a first device identifier of the first client device;
providing the logo picture corresponding to the first initial request and the first electronic identifier of the first user to the first client device;
obtaining first user identification information for a social networking platform operated by the service provider, the first user identification information corresponding to the first user of the first client device based on a current active login state of the first user on the social networking platform through the first client device; and
storing the first user identification information in association with the first electronic identifier of the first user mapped with the logo picture and the first device identifier of the first client device, wherein the first user identification information is linked to a first set of characteristics of the first user;
receiving, in response to a second request by the first user to access a second website operated by the service provider on the first client device, a first subsequent request for retrieving the logo picture to be displayed on the second website on the first client device; and
in response to receiving the first subsequent request:
sending a request for the first electronic identifier of the first user to the first client device;
receiving the first electronic identifier of the first user from the first client device, wherein the first client device retrieves the first electronic identifier of the first user and the logo picture from its cache and returns the first electronic identifier of the first user to the logo server and displays the logo picture on the second website operated by the service provider;
identifying the first set of characteristics of the first user according to the stored association between the received first electronic identifier of the first user mapped with the logo picture and the first device identifier of the first client device and the first user identification information for the social networking platform that corresponds to the first user of the first client device; and
providing one or more advertisements to the first client device based at least in part on the first set of characteristics of the first user for display on the second website operated by the service provider.

17. The non-transitory computer readable storage medium of claim 16, wherein the logo picture is provided on multiple websites hosted by distinct web servers.

18. The non-transitory computer readable storage medium of claim 16, wherein the first initial request corresponds to the first website, and wherein the first subsequent request corresponds to the second website distinct from the first website.

19. The non-transitory computer readable storage medium of claim 16, wherein the first initial request includes a first IP address of the first client device, and wherein obtaining the first user identification information for the social networking platform further comprises:

sending a request to a server of the social networking platform for respective identification information corresponding to the first IP address; and in response to the request for the respective identification information corresponding to the first IP address, receiving the first user identification information for the social networking platform that corresponds to the first user of the first client device, wherein the first user is currently logged into the social networking platform at the first client device with the first IP address in the first initial request.

20. The non-transitory computer readable storage medium of claim 16, wherein the instructions cause the server to perform operations further comprising:

receiving a second initial request for the logo picture hosted by the logo server from a second client device, wherein the second initial request includes a second IP address of the second client device;

in response to the second initial request for the logo picture:

generating a second electronic identifier mapped with the logo picture and a second device identifier of the second client device;

providing the logo picture corresponding to the second initial request and the second electronic identifier to the second client device;

obtaining second user identification information for the social networking platform based on one or more user accounts for the social networking platform that have previously logged into the social networking platform under the second IP address of the second client device;

storing the second user identification information in association with the second electronic identifier, wherein the second user identification information is linked to a second set of characteristics;

receiving a second subsequent request for the logo picture from the second client device, wherein the second subsequent request includes the second electronic identifier; and in response to receiving the second subsequent request including the second electronic identifier:

identifying the second set of characteristics according to the stored association between the second electronic identifier and the second user identification information for the social networking platform; and providing one or more advertisements to the second client device based at least in part on the second set of characteristics.

\* \* \* \* \*